(12) United States Patent
Kim

(10) Patent No.: US 9,024,914 B2
(45) Date of Patent: May 5, 2015

(54) METHOD OF DETECTING TOUCH POSITION, TOUCH POSITION DETECTING APPARATUS FOR PERFORMING THE METHOD AND DISPLAY APPARATUS HAVING THE TOUCH POSITION DETECTING APPARATUS

(75) Inventor: Guk-Hyun Kim, Gyeonggi-do (KR)

(73) Assignee: Samsung Display Co., Ltd. (KR)

( * ) Notice: Subject to any disclaimer, the term of this patent is extended or adjusted under 35 U.S.C. 154(b) by 239 days.

(21) Appl. No.: 12/940,795

(22) Filed: Nov. 5, 2010

(65) Prior Publication Data

US 2011/0163997 A1 Jul. 7, 2011

(30) Foreign Application Priority Data

Jan. 7, 2010 (KR) .................. 10-2010-0001065

(51) Int. Cl.
*G06F 3/042* (2006.01)

(52) U.S. Cl.
CPC .... *G06F 3/0421* (2013.01); *G06F 2203/04109* (2013.01)

(58) Field of Classification Search
CPC ................................................. G06F 3/0421
USPC .................................................. 345/173–178
See application file for complete search history.

(56) References Cited

U.S. PATENT DOCUMENTS

| | | | |
|---|---|---|---|
| 7,467,380 B2 * | 12/2008 | Kurlander et al. ............ 717/174 |
| 7,471,865 B2 | 12/2008 | Graham | |
| 7,924,272 B2 * | 4/2011 | Boer et al. ..................... 345/175 |
| 7,995,039 B2 * | 8/2011 | Eliasson et al. ............... 345/173 |
| 8,013,845 B2 * | 9/2011 | Ostergaard et al. ........... 345/176 |
| 8,218,154 B2 * | 7/2012 | Ostergaard et al. ........... 356/614 |
| 8,441,467 B2 * | 5/2013 | Han .............................. 345/175 |
| 2004/0161222 A1 * | 8/2004 | Niida et al. ................... 385/146 |
| 2006/0001653 A1 | 1/2006 | Smits | |
| 2006/0114237 A1 | 6/2006 | Crockett et al. | |
| 2007/0084989 A1 | 4/2007 | Lange et al. | |
| 2008/0252619 A1 | 10/2008 | Crockett et al. | |
| 2008/0284925 A1 | 11/2008 | Han | |
| 2009/0033637 A1 | 2/2009 | Han | |
| 2009/0122020 A1 | 5/2009 | Eliasson et al. | |
| 2009/0153519 A1 * | 6/2009 | Suarez Rovere ............. 345/173 |
| 2009/0273794 A1 | 11/2009 | Ostergaard et al. | |
| 2010/0066704 A1 * | 3/2010 | Kasai ........................... 345/175 |
| 2010/0135613 A1 * | 6/2010 | Terakawa et al. ............... 385/27 |
| 2010/0251167 A1 * | 9/2010 | DeLuca et al. ................ 715/786 |
| 2010/0295821 A1 * | 11/2010 | Chang et al. ................... 345/175 |
| 2012/0068973 A1 * | 3/2012 | Christiansson et al. ...... 345/175 |

FOREIGN PATENT DOCUMENTS

| | | |
|---|---|---|
| JP | 11-119912 | 4/1999 |
| JP | 2000-172444 | 6/2000 |
| JP | 2004-185495 | 7/2004 |

(Continued)

*Primary Examiner* — Kathy Wang-Hurst
*Assistant Examiner* — Joseph Fox
(74) *Attorney, Agent, or Firm* — Innovation Counsel LLP

(57) ABSTRACT

In a method of detecting a touch position, light is emitted. A plurality of light beams derived from the emitted light is received. The light beams have different paths from each other. The light beams are partially reflected according to a touch. The touch position is detected based on an amount of light in the received light beams. According to the present invention, the touch positions of several touching elements may be individually detected.

14 Claims, 17 Drawing Sheets

(56) References Cited

FOREIGN PATENT DOCUMENTS

| | | |
|---|---|---|
| JP | 2009-103902 | 5/2009 |
| JP | 2009-110540 | 5/2009 |
| JP | 2009-288948 | 12/2009 |
| KR | 1020080047048 A | 5/2008 |
| KR | 1020090037138 A | 4/2009 |
| KR | 1020090081481 A | 7/2009 |

* cited by examiner

METHOD OF DETECTING TOUCH POSITION, TOUCH POSITION DETECTING APPARATUS FOR PERFORMING THE METHOD AND DISPLAY APPARATUS HAVING THE TOUCH POSITION DETECTING APPARATUS

PRIORITY STATEMENT

This application claims priority under 35 U.S.C. §119 to Korean Patent Application No. 10-2010-0001065, filed on Jan. 7, 2010 in the Korean Intellectual Property Office (KIPO), the contents of which are herein incorporated by reference in their entirety.

BACKGROUND OF THE INVENTION

1. Field of the Invention

A method of detecting a touch position, a touch position detecting apparatus for performing the method and a display apparatus having the touch position detecting apparatus are provided. More particularly, a method of detecting a plurality of touch positions among a plurality of touching elements, a touch position detecting apparatus for performing the method and a display apparatus having the touch position detecting apparatus are provided.

2. Description of the Related Art

A touch panel is one type of input device that provides an interface between an information communication apparatus having a display and a user. The user directly contacts the touch panel with a finger or a pen so that the user and the information communication apparatus may exchange information.

Using a touch panel is an interactive and relatively intuitive way to operate a computer, as it is similar to touching a button, so that the touch panel is easily used by all ages. Thus, use of touch panels is broadly applied to, for example, cellular phones, personal digital assistants (PDA), information boards in a bank, a public office, a medical center or a tourist center direction board, etc. Such touch panels typically employ a liquid crystal display (LCD) apparatus or a cathode ray tube (CRT).

Touch panels may be classified via the method for detecting the touch, and include, for example, resistive/pressure sensitive types, capacitive/electrostatic types, and an infrared types, among others.

For example, infrared type touch panels use certain characteristics of light, for instance that it travels straight and is blocked by an obstacle, to detect a touch. Infrared type touch panels include an infrared ray light emitting diode (LED) and a photo transistor that faces the infrared ray LED. The infrared ray LED emits light and the photo transistor receives the light. When a light blocking object such as a finger is disposed on the touch panel, light emitted from the infrared ray LED is blocked by the light blocking object. Then, a cell position at which the light is blocked may be detected based on an amount of light received by a light receiving element, such as the photo transistor.

However, infrared type touch panels may not be capable of distinguishing touches that are made by different touching elements. For example, infrared type touch panels may not be able to distinguish a touch of a finger from a touch of a pen, and as a result the touch position of the pen may not be detected.

SUMMARY OF THE INVENTION

A method of individually detecting a plurality of touch positions from a plurality of touching elements is provided.

A touch position detecting apparatus for performing the above-mentioned method is also provided, as well as a display apparatus having the touch position detecting apparatus.

In one aspect alight is emitted. A plurality of light beams derived from the emitted light are received. The light beams have different paths from each other. The light beams are partially reflected according to a touch. The touch position is detected based on an amount of light in the received light beams.

The light beams having the paths different from each other may be individually received.

The light beams may be partially reflected by a plurality of touching elements, and the touching elements may have refractive indices different from each other.

The light may be emitted by a plurality of light emitting elements that each emits one or more light beams.

The light beams may be derived from the emitted light by passing the emitted light through an incident surface of a light waveguide, the incident surface having a plurality of inclined.

The touch position of an n-th touching element may be detected based on an amount of light in an n-th light beam. The touch positions of the n-th touching element and an (n−1)-th touching element may be detected based on an amount of light in an (n−1)-th light beam. The touch position of the (n−1)-th touching element may be detected using the touch position of the detected n-th touching element and the touch positions of the detected n-th and (n−1)-th touching elements. Herein, n is a natural number.

In another aspect, a touch position detecting apparatus includes a light emitting part, a light waveguide, a light receiving part and a detecting part. The light emitting part emits light. The light waveguide includes a light incident surface, a touch surface and a light exiting surface. The light incident surface is disposed adjacent to the light emitting part. The light is incident into the light incident surface. The touch surface is touched by a touch. The light exiting surface is opposite to the light incident surface. A plurality of light beams exits the light exiting surface. The light beams have different paths from each other. The light beams are partially reflected according to the touch. The light receiving part is adjacent to the light exiting surface and includes a plurality of light receiving elements respectively receiving the light beams exiting from the light exiting surface. The detecting part detects a touch position based on an amount of light in the light beams received by the light receiving part.

The light emitting part may include a plurality of light emitting elements emitting the light beams.

Light emitting surfaces of the light emitting elements may have directions different from each other.

The light incident surface may be substantially perpendicular to the touch surface of the light waveguide.

The light exiting surface may be substantially perpendicular to the touch surface of the light waveguide.

The light incident surface may be connected to the touch surface of the light waveguide with a first inclination angle.

The light exiting surface may be connected to the touch surface of the light waveguide with a second inclination angle. The first inclination angle may be substantially equal to the second inclination angle.

The light incident surface of the light waveguide may include a plurality of first inclined surfaces. The first inclined surfaces may convert the light emitted from the light emitting part into the light beams The light exiting surface of the light waveguide may include a plurality of second inclined surfaces. The second inclined surfaces may respectively face the first inclined surfaces.

In yet another aspect, a display apparatus includes a light emitting part, a light waveguide, a light receiving part, a detecting part and a display panel. The light emitting part emits light. The light waveguide includes a light incident surface, a touch surface and a light exiting surface. The light incident surface is disposed adjacent to the light emitting part. The light is incident to the light incident surface. The touch surface is touched by a touch. The light exiting surface is opposite to the light incident surface. A plurality of light beams exits the light exiting surface. The light beams have different paths from each other. The light beams are partially reflected according to the touch. The light receiving part is adjacent to the light exiting surface and includes a plurality of light receiving elements respectively receiving the light beams exiting from the light exiting surface. The detecting part detects a touch position based on an amount of light in the light beams received by the receiving part. The display panel is disposed under the light waveguide and displays an image according to the touch position.

The light emitting part may include a plurality of light emitting elements emitting the light beams.

The light incident surface may be connected to the touch surface of the light waveguide with a first inclination angle. The light exiting surface may be connected to the touch surface of the light waveguide with a second inclination angle. The first inclination angle may be substantially equal to the second inclination angle.

The light incident surface of the light waveguide may include a plurality of first inclined surfaces. The first inclined surfaces may convert the light emitted from the light emitting part into the light beams.

The light exiting surface of the light waveguide may include a plurality of second inclined surfaces. The second inclined surfaces may respectively face the first inclined surfaces.

The touch positions of the touching elements may be individually detected using the light beams partially reflected and having different paths from each other. Thus, the several touching elements may be individually used. In addition, when various kinds of touches are applied at the same time, the touches by the touching elements may be correctly distinguished.

BRIEF DESCRIPTION OF THE DRAWINGS

The above and other features and advantages will become more apparent by describing example embodiments thereof with reference to the accompanying drawings, in which.

DETAILED DESCRIPTION OF THE INVENTION

Figure 1:
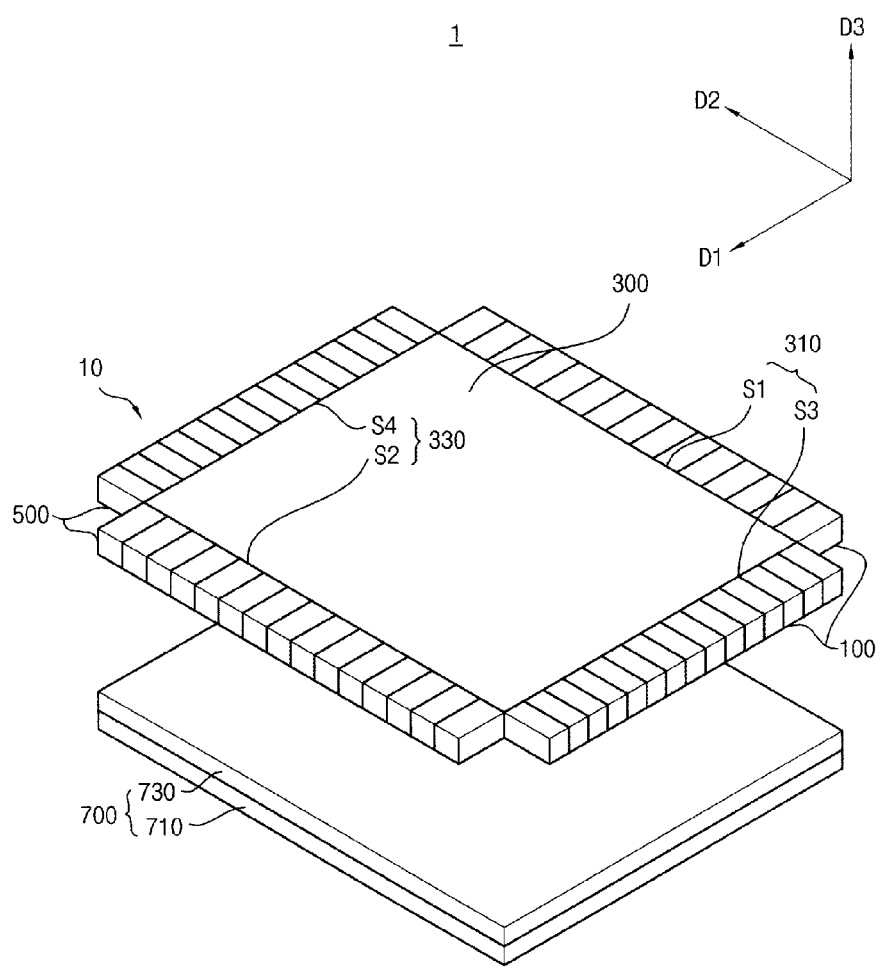
FIG. 1 is a perspective view illustrating a display apparatus according to an example embodiment.

Example embodiments are described more fully hereinafter with reference to the accompanying drawings. The present invention may, however, be embodied in many different forms and should not be construed as limited to the example embodiments set forth herein. Rather, these example embodiments are provided so that this disclosure will be thorough and will convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section, etc. from another element, component, region, layer or section, etc. Thus, a first element, component, region, layer or section discussed below could be termed a second element, component, region, layer or section without departing from the teachings of the disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation. The device may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a perspective view illustrating a display apparatus according to an example embodiment.

Referring to FIG. 1, the display apparatus 1 includes a touch position detecting apparatus 10 and a display panel 700.

The touch position detecting apparatus 10 is disposed on the display panel 700.

The touch position detecting apparatus 10 includes a light emitting part 100, a light waveguide 300 and a light receiving part 500.

When an external touch is applied to the display panel 700, the touch position detecting apparatus 10 detects the position that the touch occurred and provides information on the touch position to the display panel 700.

The light emitting part 100 is disposed on a light incident surface 310 of the light waveguide 300. The light emitting part 100 emits light that is incident onto the light incident surface 310.

The light incident to light incident surface 310 travels through the light waveguide 300. The light waveguide 300 totally or partially reflects a plurality of light beams, or rays, from the light emitting part 100 toward the inside of the light waveguide 300. The light beams originate from the light that is incident to the light incident surface and have paths that are different from each other.

The light receiving part 500 is disposed on a light exiting surface 330 of the light waveguide 300 and faces the light incident surface 310. The light receiving part 500 receives the light beams that pass through the light waveguide 300.

The light waveguide 300 includes a first side surface S1, a second side surface S2, a third side surface S3 and a fourth side surface S4. The first side surface S1 and the second side surface S2 face each other, and the third side surface S3 and the fourth side surface S4 face each other.

The first side surface S1 and the third side surface S3 represent the light incident surface 310, and the second side surface S2 and the fourth side surface S4 represent the light exiting surface 330.

The light beams are totally or partially reflected by an upper surface and a lower surface of the light waveguide 300 and are transmitted in, generally, a first direction D1 or in a second direction D2. A third direction D3 may be defined as a direction from the lower surface to the upper surface of the light waveguide 300. Herein, the upper surface may be a touch surface on which touching elements, such as a finger or a pen, for example, are touched.

The touch position detecting apparatus 10 detects the touch position based on an amount of light received by the light receiving part. The touch position detecting apparatus 10 is described below.

The display panel 700 is disposed under the light waveguide 300 and displays an image through light waveguide 300, which is transparent. The display panel 700 displays the image according to a touch position provided from the touch position detecting apparatus 10.

The display panel 700 includes a first substrate 710 and a second substrate 730 opposite to the first substrate 710. The display panel 700 may be, for example, a liquid crystal display (LCD) panel, a field emission display (FED) panel, a plasma display panel (PDP), a light emitting display (LED) panel, or other type of display panel.

The first substrate 710 may include a plurality of data lines, a plurality of gate lines crossing the data lines, a pixel area defined by the data lines and the gate lines and a thin-film transistor (TFT) formed on the pixel area. The TFT provides an image signal received from the data line to the pixel area in response to a gate signal received from the gate line.

The second substrate 730 may also include a color filter, a common electrode, a black matrix and so on. Alternatively, the first substrate 710 may include the color filter and the common electrode.

For example, when the display panel 700 is an LCD panel, the display panel 700 may further include a liquid crystal layer disposed between the first substrate 710 and the second substrate 730, and a backlight assembly disposed under the display panel 700 and providing light to the display panel 700. The pixel area is formed by the common electrode and a pixel electrode connected to the TFT, which is opposite to the common electrode. The liquid crystal layer is interposed between the common electrode and the pixel electrode so that the common electrode and the pixel electrode may form a liquid crystal capacitor. The pixel area may include a storage capacitor that maintains the charged image signal until a next image signal is charged.

Figure 2:
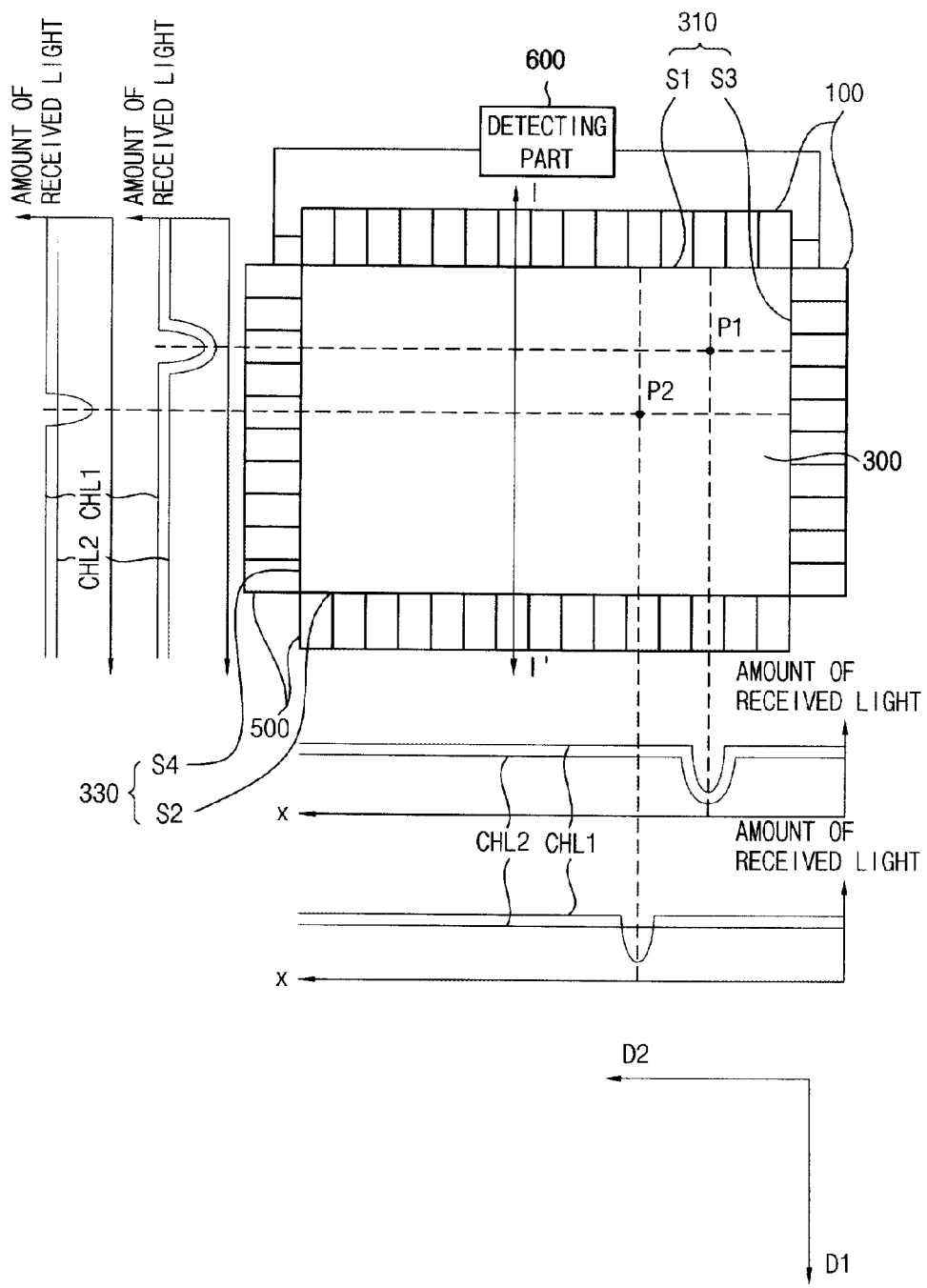
FIG. 2 is a plan view illustrating a touch position detecting apparatus of FIG. 1.

FIG. 2 is a plan view illustrating the touch position detecting apparatus of FIG. 1.

Referring to FIGS. 1 and 2, the touch position detecting apparatus 10 includes the light emitting part 100, the light waveguide 300, the light receiving part 500 and a detecting part 600.

The touch position detecting apparatus 10 uses the optical phenomenon of total reflection of light, and, in particular, utilizes frustrated total internal reflection (FTIR). The total reflection of light is an optical phenomenon which occurs when light crosses a boundary from a dense medium to a rare medium, or, in other words, when light travels from a medium having a higher refractive index to a medium having a lower refractive index. When light crosses a boundary surface between two such mediums and the incident angle of the light is larger than a critical angle with respect to a perpendicular direction of a boundary surface between the two mediums, total reflection occurs. Hereinafter the critical angle is defined with respect to a parallel direction of a boundary surface between the two mediums, so that the total reflection of the light occurs when the incident angle is smaller than the critical angle.

The light emitting part 100 includes a light emitting array disposed along the first side surface S1 and the third side surface S3 to provide the incident light to the light incident surface 310.

The light waveguide 300 totally reflects the light beams that enter the light waveguide 300 toward the inside of the light waveguide 300. The light waveguide 300 may include an acrylic resin such as polymethylmethacrylate (PMMA) or a fire resistant glass material such as a white glass. In addition, the light waveguide 300 may include polycarbonate or polystyrene.

The total reflection of the light inside of the light waveguide 300 may be frustrated, that is, a portion of the light may not be totally reflected, when the light waveguide is contacted by an external object.

The light receiving part 500 may include a light receiving array disposed along the second side surface S2 and the fourth side surface S4 corresponding to the light emitting array. The second side surface S2 and the fourth side surface S4 are the light exiting surfaces facing the light incident surfaces. The light receiving part 500 receives the light beams that pass through the light waveguide 300.

For example, the light emitting part 100 disposed on the first side surface S1 emits light in the first direction D1, the light waveguide 300 transmits the light that enters the waveguide 300 in the first direction D1, and then the light receiving part 500 disposed on the second side surface S2 receives the light as it exits the waveguide 300.

The light emitting part 100 disposed on the third side surface S3 emits light in the second direction D2 that is substantially perpendicular to the first direction D1, the light waveguide 300 transmits the light that enters the waveguide 300 in the second direction D2, and then the light receiving part 500 disposed on the fourth side surface S4 receives the light as it exits the waveguide 300.

The detecting part 600 detects the touch position of the light waveguide 300 based on an amount of light received by the light receiving part 500.

Figure 3A:
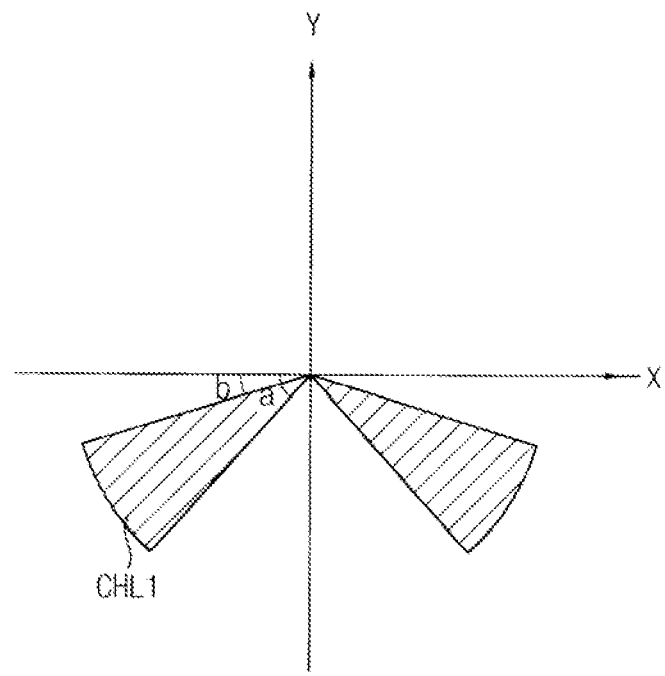
FIGS. 3A to 3C are graphs illustrating transmission conditions of a first light beam in a light waveguide according to a first refractive index of the light waveguide, air and the touching elements of FIG. 2.
Figure 3B:
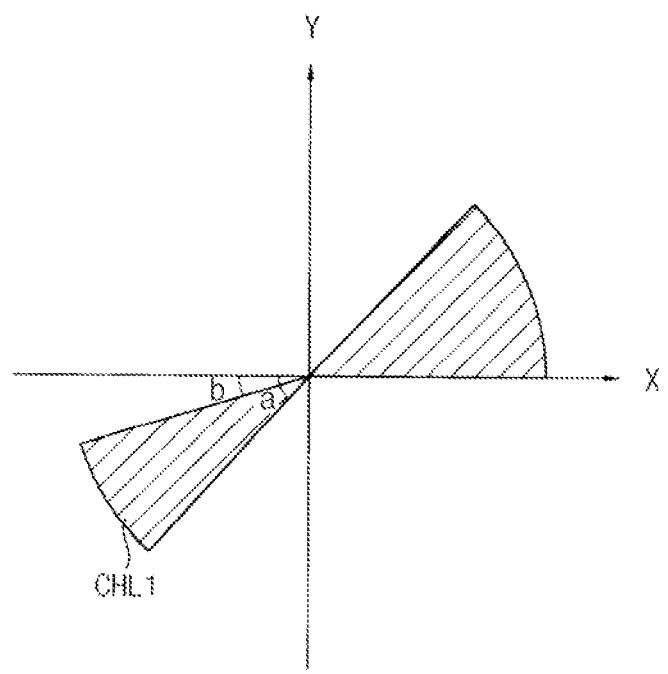
Figure 3C:
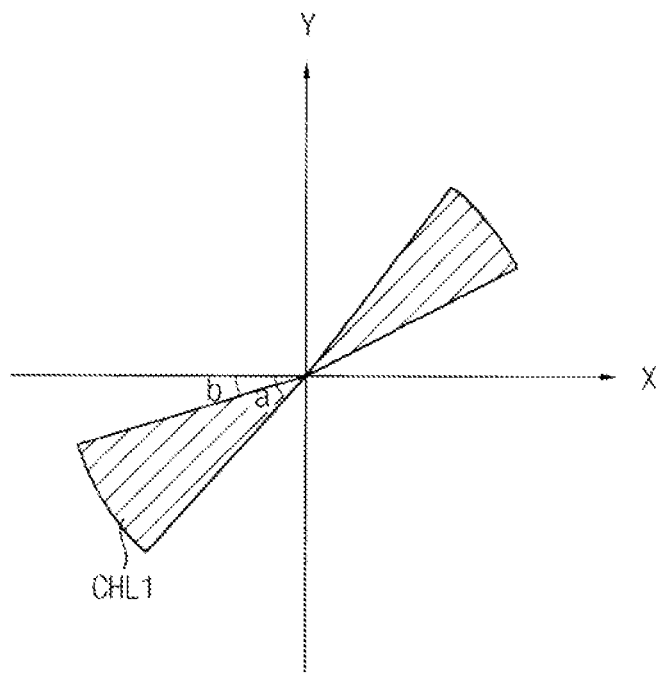

FIGS. 3A to 3C are graphs illustrating the transmission condition of a first light beam in the light waveguide according to a first refractivity ratio of the light waveguide of FIG. 2, the air and the touching elements. Herein, the X axis represents a boundary surface between the light waveguide and the air, or a boundary surface between the light waveguide and the touching elements, when touching elements are present. The X axis also indicates the first direction D1.

Referring to FIGS. 2 to 3C, in this example, according to the first refractivity ratio, a wavelength of the light emitted from the light emitting part is about 850 nm, the refractive index of the air is about 1, the refractive index of the light waveguide 300 is about 1.484, the refractive index of a first touching element is about 1.417 and the refractive index of a second touching element is between about 1.485 and about 1.6. For example, the first touching element may be a human hand and the second touching element may be a pen.

In the present example embodiment, PMMA, which has a refractive index of about 1.484, is used as the light waveguide 300. Polycarbonate and polystyrene may also be used as the light waveguide 300. The refractive index of polycarbonate is about 1.569 and the refractive index of polystyrene is about 1.576.

In addition, in the present example embodiment, because PMMA, which has a refractive index of about 1.484, is used as the light waveguide 300, the second touching element may include polyacrylate, polycarbonate or polystyrene. Polyacrylate, polycarbonate or polystyrene have refractive indices between about 1.484 and about 1.6, which are larger than the refractive index of PMMA. For instance, the refractive index of polyacrylate is about 1.488.

An angle a shown in FIG. 3A represents a first critical angle of the total reflection when the light is incident from the light waveguide 300 to the air, and the angle b represents a second critical angle of the total reflection when the light is incident from the light waveguide 300 to the first touching element.

In the present example embodiment, the first critical angle a may be about 48 degrees with respect to the X axis, and the second critical angle b may be about 17 degrees with respect to the X axis.

Equation 1 represents the first critical angle a and the second critical angle b in the light waveguide 300.

$$\theta_c = \cos^{-1}\frac{n1}{n2}$$ [Equation 1]

In this case, θc is a critical angle with respect to the boundary surface between mediums, n1 is the refractive index of the air or the first touching element, and n2 is the refractive index of the light waveguide 300. Total reflection occurs when the incident angle of light with respect to the boundary surface between the mediums is smaller than θc. However, total reflection is frustrated when the incident angle of light is larger than θc.

Referring again to FIGS. 2 and 3A, a first light beam CHL1 travels through the light waveguide 300 and is incident into a surface, typically an upper surface, of the waveguide 300, which is a boundary between the light waveguide 300 and air. The first light beam can have an incident angle to the surface of the light waveguide 300 of between the first and second critical angles a and b. (The range of potential incident angles of light beam CHL1 is represented in FIGS. 3A-3C as the hatched area). When the light waveguide 300 is not contacted with a touching element, the first light beam CHL1 is totally reflected because the incident angle of the first light beam CHL1 is smaller than the first critical angle a.

Referring to FIGS. 2 and 3B, the first light beam CHL1 travels through the light waveguide 300 and is incident into a surface of the light waveguide 300 with an angle between the first and second critical angles a and b. However, in FIG. 3B, the first touching element (not shown) is making contact with the light waveguide 300, for example, the light waveguide 300 makes contact with a human hand, at a position on the surface of the light waveguide 300 at which the first light beam CHL1 is incident (i.e., where the Y axis crosses the X axis in FIG. 3B). In this case, the first light beam CHL1 is partially absorbed and is partially reflected because the incident angle of the first light beam CHL1 is larger than the second critical angle b.

For example, the first light beam CHL1 that has an incident angle onto the surface of the light waveguide 300 of between about 17 degrees and about 48 degrees, which is a range of the first and second critical angles, is partially refracted to an angle between about 0 degree and about 46 degrees and is then partially absorbed by the first touching element.

Referring to FIGS. 2 and 3C, the first light beam CHL1 travels through the light waveguide 300 and is incident into a surface of the light waveguide 300 with an angle between the first and second critical angles a and b. In this case, however, the second touching element (not shown), for example, a pen, makes contact with the light waveguide 300 at a position on the surface of the light waveguide 300 at which the first light beam CHL1 is incident (i.e., where the Y axis crosses the X axis in FIG. 3C). The first light beam CHL1 is partially absorbed and is partially reflected closer to the Y axis in the third direction D3 since the refractive index of the second touching element is larger than the refractive index of the light waveguide 300.

For example, the first light beam CHL1 advancing at an angle between about 17 degrees and about 48 degrees, which is a range of the first and second critical angles, is partially refracted to an angle between about 27 degrees and about 52 degrees and is then partially absorbed by the second touching element.

In the present example embodiment, the first light beam CHL1, which has an amount of light that is decreased at the touch position of the first and second touching elements, may have an incident angle between about 17 degrees and about 48 degrees or between about −17 degrees and about −48 degrees, since the first critical angle a is about 48 degrees and the second critical angle b is about 17 degrees.

Figure 4A:
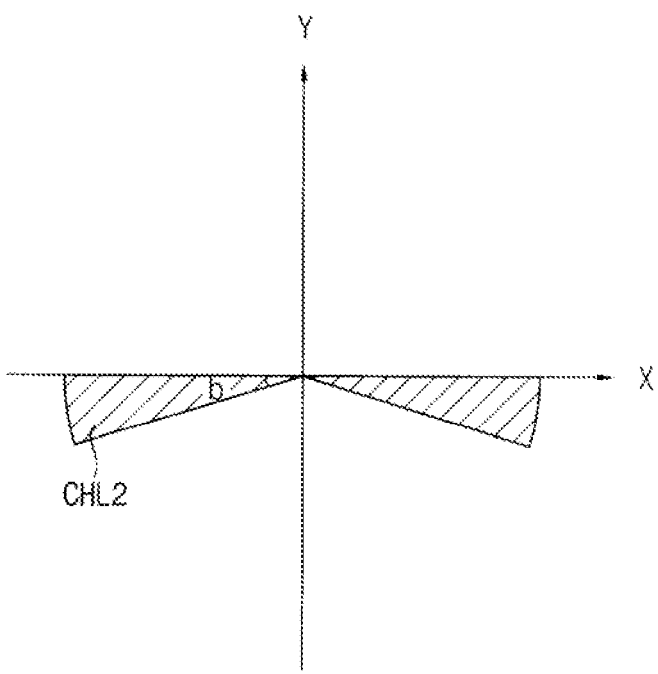
FIGS. 4A to 4C are graphs illustrating the transmission conditions of a second light beam in the light waveguide according to the first refractive index of the light waveguide, air and the touching elements of FIG. 2.
Figure 4B:
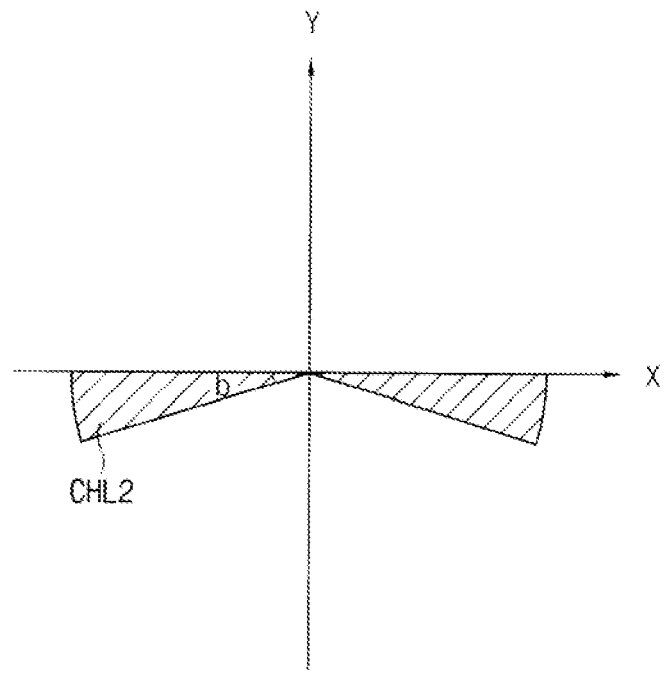
Figure 4C:
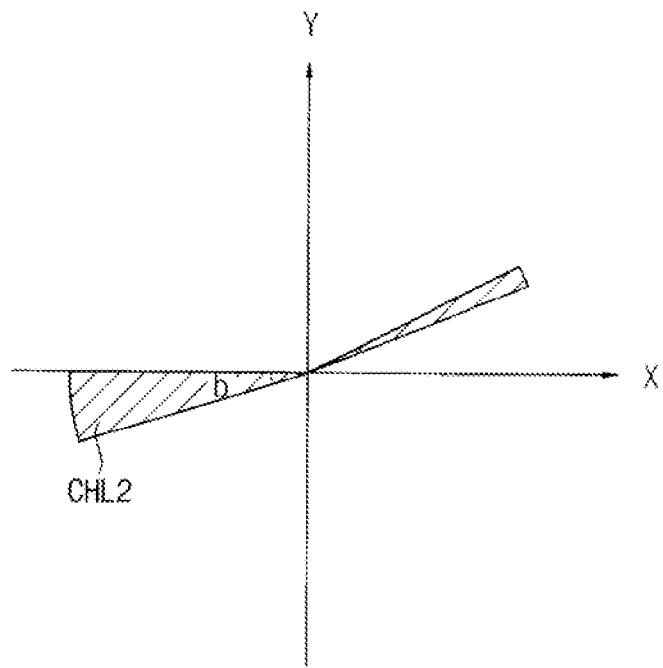

FIGS. 4A to 4C are graphs illustrating the transmission condition of a second light beam in the light waveguide 300 according to the first refractivity ratio of the light waveguide of FIG. 2, the air and the touching elements. Herein, the X axis represents the boundary surface between the light waveguide 300 and the air, and also the boundary surface between the light waveguide 300 and the touching elements. The X axis also indicates the first direction D1.

Referring to FIGS. 2, 3A and 4A, a second light beam CHL2 travels through the light waveguide 300 and is incident into a surface, typically an upper surface, of the waveguide 300, which is a boundary between the light waveguide 300 and air. The second light beam CHL2 can have an incident angle to the surface of the light waveguide 300 of between the second critical angle b and 0 degrees. (The range of potential incident angles of the second light beam CHL2 is represented in FIGS. 4A-4C as the hatched area.) When the light waveguide 300 is not contacted with a touching element, for example, the light waveguide 300 makes contact with air, the second light beam CHL2 is totally reflected since the incident angle of the second light beam CHL2 is smaller than the first critical angle a.

Referring again to FIGS. 2, 3B and 4B, a second light beam CHL2 travels through the light waveguide 300 and is incident into a surface of the waveguide 300, with an incident angle between the second critical angle b and 0 degrees. However, in FIG. 4B, a first touching element (not shown) makes contact with the light waveguide 300, for example, the light waveguide 300 makes contact with a human hand, at a position on the surface of the light waveguide 300 at which the second light beam CHL2 is incident (i.e., where the Y axis crosses the X axis in FIG. 4B). In this case, the second light beam CHL2 is totally reflected, because the incident angle of the second light beam CHL2 is smaller than the second critical angle b.

Referring again to FIGS. 2, 3C and 4C, a second light beam CHL2 that travels through the light waveguide 300 and is incident into a surface of the waveguide 300, with an incident angle between the second critical angle b and 0 degrees. In this case, however, the second touching element (not shown), for example, a pen, is making contact with the light waveguide 300 at a position on the surface of the light waveguide 300 at which the second light beam CHL2 is incident (i.e., where the Y axis crosses the X axis in FIG. 4C). The second light beam CHL2 is partially absorbed and is partially reflected because the refractive index of the second touching element is larger than the refractive index of the light waveguide 300.

For example, the second light beam CHL2 that has an incident angle onto the surface of the light waveguide 300 of between about 0 degree and about 17 degrees is partially refracted to an angle between about 22 degrees and about 27 degrees and is then partially absorbed to the second touching element.

In the present example embodiment, the second light beam CHL2 may have an incident angle between about −17 degrees and about 17 degrees because the second critical angle b is about 17 degrees with respect to the X axis.

The amount of light in the first light beam CHL1 shown in FIGS. 3A to 3C is decreased when the first light beam CHL1 meets the first touching element or the second touching element. The amount of light in the second light beam CHL2 shown in FIGS. 4A to 4C is decreased when the second light beam CHL2 meets the second touching element. Thus, the touch of the first touching element and the second touching element may be discriminated according to the amount of light received at the first touch position P1 and the second touch position P2, shown in FIG. 2.

For example, referring to FIG. 2 again, both the first light beam CHL1 and the second light beam CHL2 are only partially reflected at the first touch position P1 at which the light waveguide 300 and the second touching element make contact with each other. For example, the amount of light in the first light beam CHL1 is decreased at the first touch position P1 and the amount of light in the second light beam CHL2 is decreased at the first touch position P1. However, only first light beam CHL1 is partially reflected at the second touch position P2 at which the light waveguide 300 and the first touching element, such as the human hand, make contact with each other. However, the amount of light in the second light beam CHL2 is not decreased at the second touch position P2. So, only the amount of light in the first light beam is decreased at the second touch position P2.

Accordingly, the detecting part 600 may detect the touch positions of the first touching element and the second touching element using the first light beam CHL1 and the touch position of the second touching element using the second light beam CHL2. As a result, the detecting part 600 may detect the touch position at which only the first touching element contacts the light waveguide 300 by subtracting the touch positions at which the second light beam CHL2 is detected from the touch positions at which the first light beam CHL1 is detected.

Although the present example embodiment was described with just two light beams that are incident into the light waveguide 300, a number n of light beams may be incident to the light waveguide 300 and a number n of touching elements may contact the light waveguide 300. Herein, n is a natural number.

When the n light beams are incident to the light waveguide 300, the touch position of an n-th touching element is detected using an n-th light beam and the touch positions of the n-th touching element and an (n−1)-th touching element are detected using an (n−1)-th light beam. As a result, the touch position at which only (n−1)-th touching element contacts the light waveguide may be detected.

In a similar manner, the touch position of the (n−1)-th touching element is detected using the (n−1)-th light beam and the touch positions of the n-th touching element, the (n−1)-th touching element and the (n−2)-th touching element are detected using an (n−2)-th light beam. As a result, the touch position at which only (n−2)-th touching element is touched may be detected.

Therefore, when n light receiving elements respectively receive the n light beams, the detecting part 600 may detect the touch positions of the first touching element to the n-th touching element according to an amount of light in the light beams.

Figure 5A:
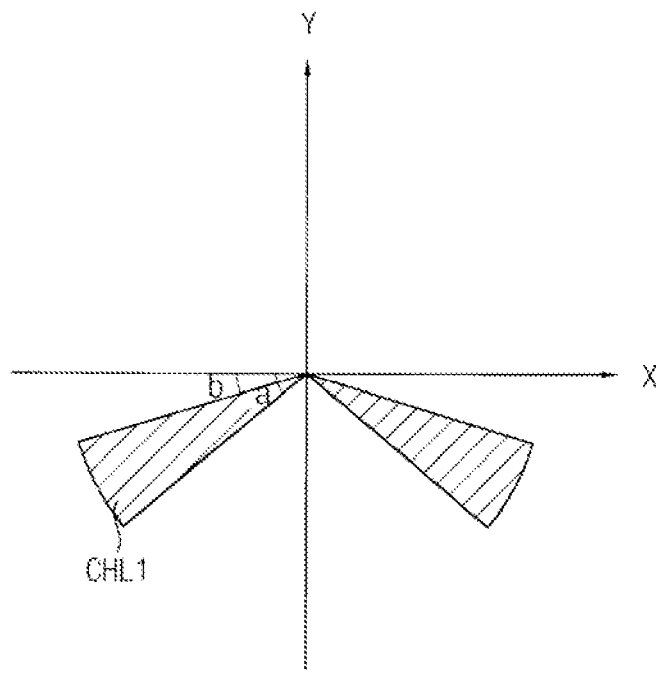
FIGS. 5A to 5C are graphs illustrating the transmission conditions of the first light beam in the light waveguide according to a second refractive index of the light waveguide, air and the touching elements of FIG. 2.
Figure 5B:
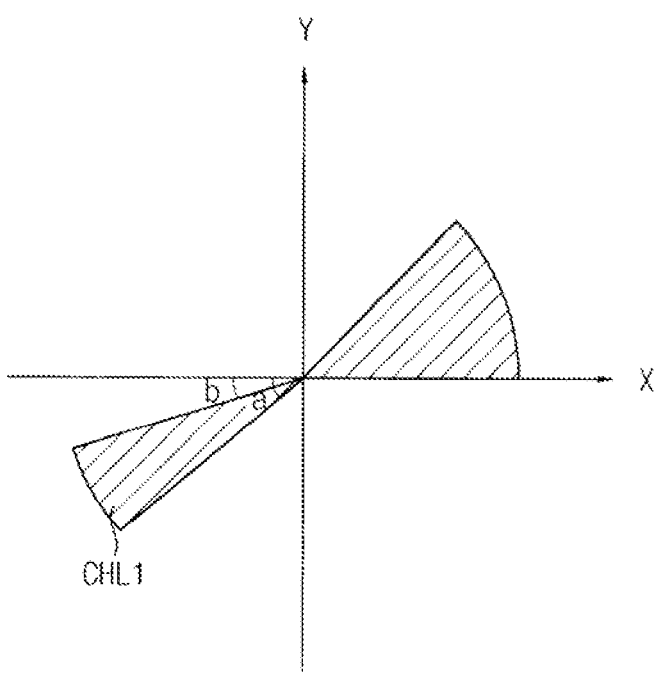
Figure 5C:
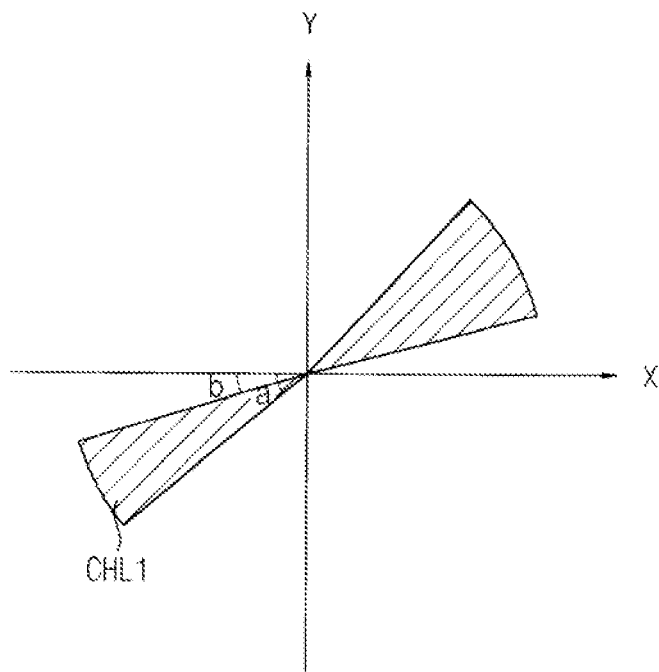

FIGS. 5A to 5C are graphs illustrating the transmission condition of a first light beam in the light waveguide according to a second refractivity ratio of the light waveguide of FIG. 2, the air and the touching elements. Herein, the X axis represents a boundary surface between the light waveguide and the air, or a boundary surface between the light waveguide and the touching elements, when touching elements are present. The X axis also indicates the first direction D1.

Referring to FIGS. 2 and 5A to 5C, for the second refractivity ratio, the refractive index of the air is about 1, the refractive index of the light waveguide 300 is about 1.484, the refractive index of the first touching element is about 1.417 and the refractive index of the second touching element is between about 1.42 and about 1.48. For example, the first touching element may be a human hand and the second touching element may be a pen.

In the present example embodiment, PMMA, which has a refractive index of about 1.484, is used as the light waveguide 300. Polycarbonate and polystyrene may also be used as the light waveguide 300. The refractive index of polycarbonate is about 1.569 and the refractive index of polystyrene is about 1.576.

In the present example embodiment, because PMMA, which has a refractive index of about 1.484, is used as the light waveguide 300, the second touching element may include cellulose. Cellulose has a refractive index of between about 1.42 and about 1.48, which is smaller than the refractive index of PMMA (about 1.484) and is larger than the refractive index of the first touching element (about 1.417). Herein, the refractive index of cellulose is about 1.463.

The first critical angle a and the second critical angle b shown in FIG. 5A are substantially the same as the first critical angle a and the second critical angle b shown in FIG. 3A, and repetitive explanation concerning the above elements will be omitted.

Referring to FIGS. 2, 3A and 5A, a first light beam CHL1 travels through the light waveguide 300 and is incident into a surface, typically an upper surface, of the waveguide 300. The first light beam CHL1 can have an incident angle to the surface of the light waveguide 300 of between the first and second critical angles a and b. (The range of potential incident angles of light beam CHL1 is represented in FIGS. 5A-5C as the hatched area). When the light waveguide 300 is not contacted with a touching element, for example, the light waveguide 300 makes contact with air, the first light beam CHL1 is totally reflected because the incident angle of the first light beam CHL1 is smaller than the first critical angle a.

Referring to FIGS. 2, 3B and 5B, the first light beam CHL1 travels through the light waveguide 300 and is incident into a surface of the light waveguide 300 with an angle between the first and second critical angles a and b. However, in FIG. 5B, the first light touching element (not shown) is making contact with the light waveguide 300, for example, the light waveguide 300 makes contact with a human hand, at a position on the surface of the light waveguide 300 at which the first light beam CHL1 is incident (i.e., where the Y axis crosses the X axis in FIG. 5B). In this case, the first light beam CHL1 is partially absorbed and is partially reflected because the incident angle of the first light beam CHL1 is larger than the second critical angle b.

For example, the first light beam CHL1 that has an incident angle into the surface of the light waveguide 300 of between about 17 degrees and about 48 degrees, which is a range of the first and second critical angles, is partially refracted to an angle between about 0 degree and about 46 degrees and is then partially absorbed by the first touching element.

Referring again to FIGS. 2, 3C and 5C, the first light beam CHL1 travels through the light waveguide 300 and is incident into a surface of the light waveguide 300 with an angle between the first and second critical angles a and b. In this case however, the second touching element (not shown), for example, a pen, makes contact with the light waveguide 300 at a position on the surface of the light waveguide 300 at which the first light beam CHL1 is incident (i.e., where the Y axis crosses the X axis in FIG. 5C). The first light beam CHL1 is partially absorbed and is partially reflected because the incident angle of the first light beam CHL1 is larger than a third critical angle (not shown).

Herein, the third critical angle is the critical angle of total reflection when the light is incident from the light waveguide 300 to the second touching element. Comparing to the FIG. 3C, the first light beam CHL1 is refracted closer to the X axis because the refractive index of the second touching element is smaller than the refractive index of the light waveguide 300.

For example, the first light beam CHL1 advancing at an angle between about 17 degrees and about 48 degrees, which is a range of the first and second critical angles, is partially refracted to an angle between about 14 degrees and about 47 degrees, and is then partially absorbed to the second touching element.

Figure 6A:
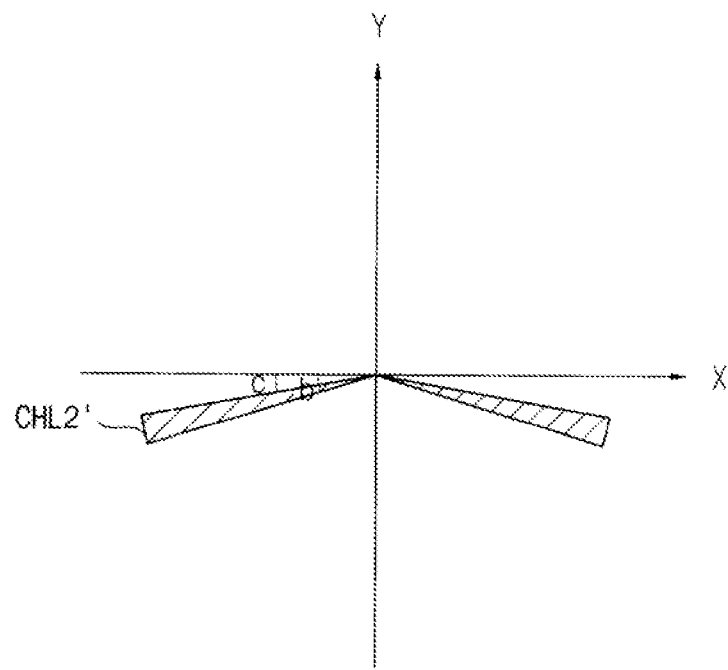
FIGS. 6A to 6C are graphs illustrating the transmission conditions of the second light beam in the light waveguide according to the second refractive index of the light waveguide, air and the touching elements of FIG. 2.
Figure 6B:
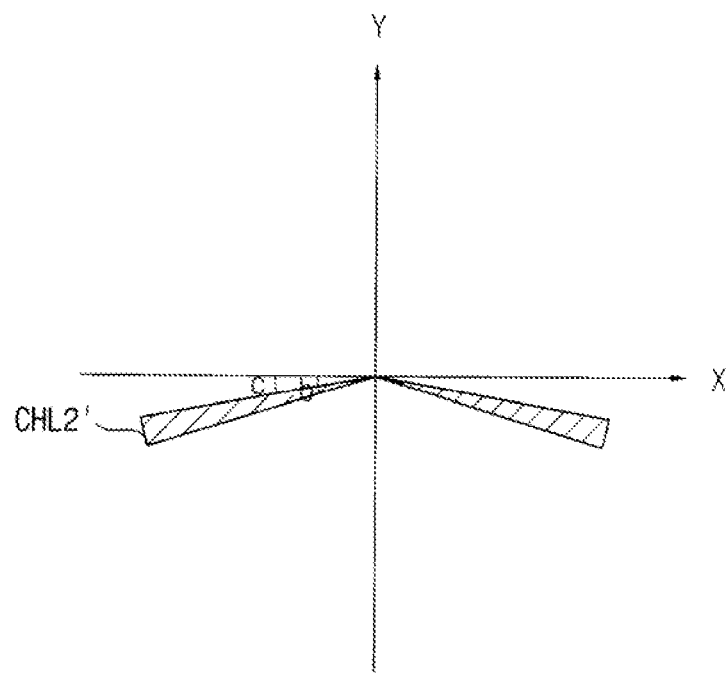
Figure 6C:
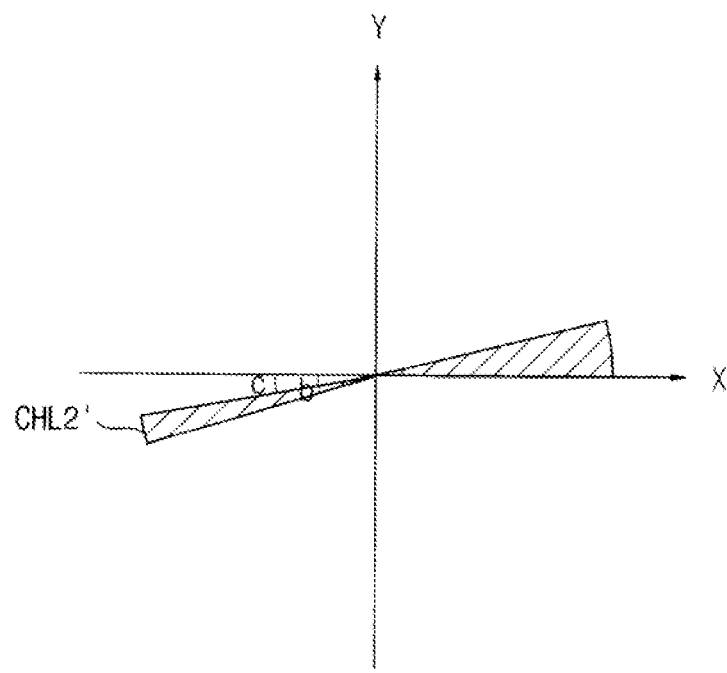

FIGS. 6A to 6C are graphs illustrating the transmission condition of the second light beam in the light waveguide 300 according to the second refractivity ratio of the light waveguide of FIG. 2, the air and the touching elements. Herein, the X axis represents the boundary surface between the light waveguide 300 and air, and also the boundary surface between the light waveguide 300 and the touching elements. The X axis also indicates the first direction D1. In addition, an angle c is the third critical angle. The third critical angle may be about 10 degrees.

Referring to FIGS. 2, 5A and 6A, a second light beam CHL2' travels through the light waveguide 300 and is incident into a surface, typically an upper surface, of the waveguide 300, which is a boundary between the light waveguide 300 and air. The first light beam can have an incident angle to the surface of the light waveguide 300 of between the second critical angle b and the third critical angle c. (The range of potential incident angles of light beam CHL2' is represented in FIGS. 6A-6C as the hatched area). When light waveguide 300 is not contacted with a touching element, for example, the light waveguide 300 makes contact with air, the second light beam CHL2' is totally reflected because the incident angle of the second light beam CHL2' is smaller than the first critical angle a.

Referring to FIGS. 2, 5B and 6B, the second light beam CHL2' travels through the light waveguide 300 an is incident into a surface of the light waveguide 300 with an angle between the second critical angle b and the third critical angle c. However, in FIG. 6B, the first touching element (not shown) makes contact with the light waveguide 300, for example, the light waveguide 300 makes contact with a human hand, at a position on the surface of the light waveguide 300 at which the second light beam CHL2' is incident (i.e., where the Y axis crosses the X axis in FIG. 6B). In this case, the second light beam CHL2' is totally reflected because the incident angle of the second light beam CHL2' is smaller than the second critical angle b.

Referring to FIGS. 2, 5C and 6C, the second light beam CHL2' travels through the light waveguide 300 and is incident into a surface of the light waveguide 300 with an angle between the second critical angle b and the third critical angle c. In this case, however, the t second touching element, for example, a pen, makes contact with the light waveguide 300 at a position on the surface of the light waveguide 300 at which the second light beam CHL2' is incident (i.e., where the Y axis crosses the X axis in FIG. 6C.) The second light beam CHL2' is partially absorbed and is partially reflected because the incident angle of the second light beam CHL2' is larger than the third critical angle c.

For example, the second light beam CHL2' advancing at an angle between about 0 degree and about 17 degrees, which are smaller than the second critical angle b, is partially refracted to an angle between about 0 degree and about 14 degrees and is partially absorbed into the second touching element.

Figure 7:
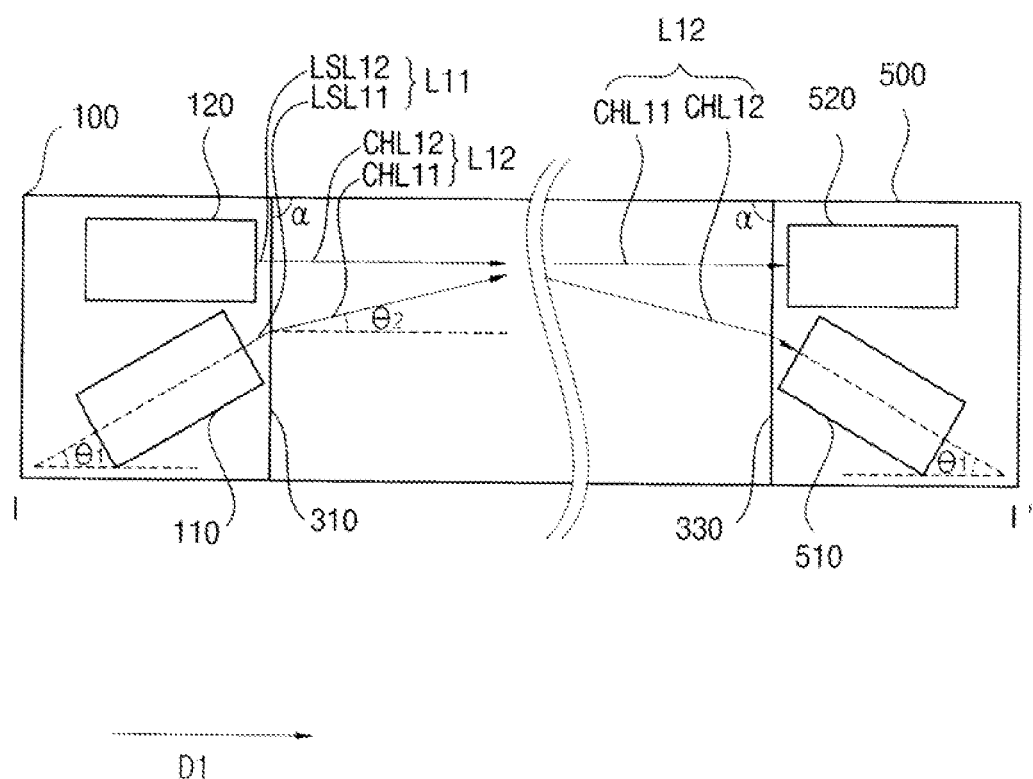
FIG. 7 is a cross-sectional view of the touch position detecting apparatus taken along a line I-I' in FIG. 2.
Figure 8:
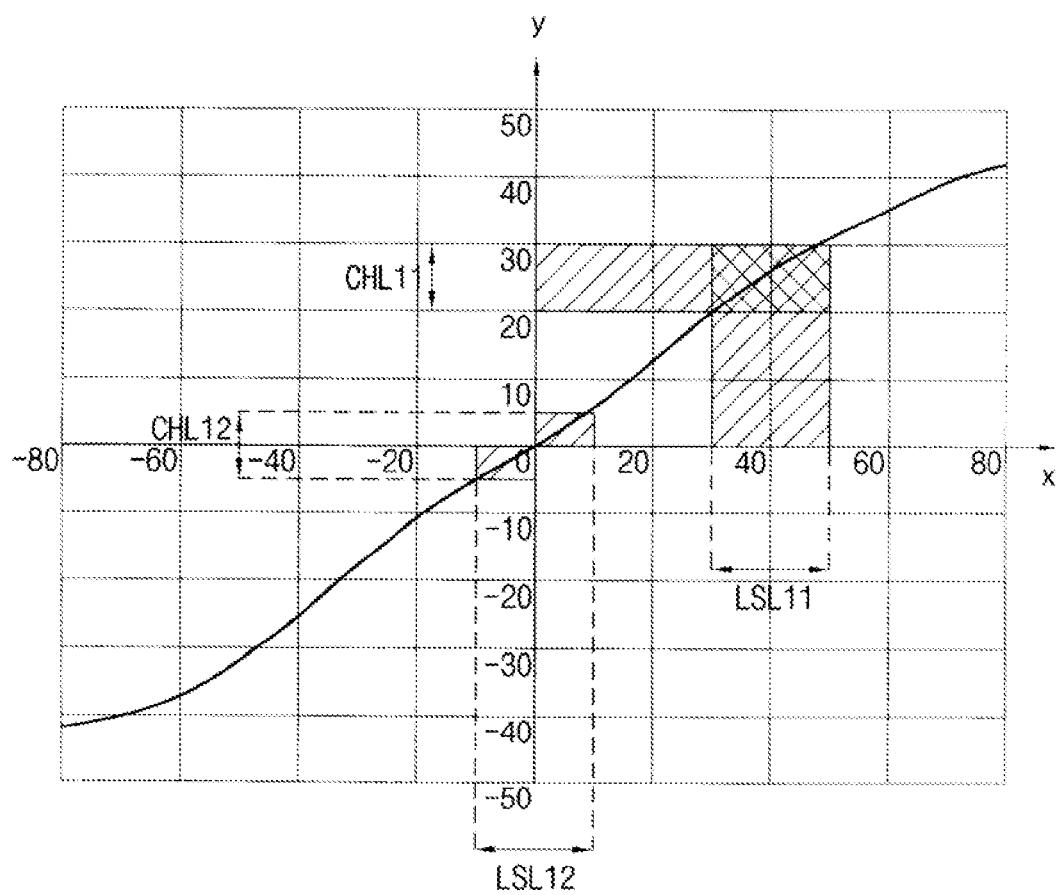
FIG. 8 is a graph illustrating a light advancing angle of the first light beam and the second light beam of FIG. 7.

FIG. 7 is a cross-sectional view of the touch position detecting apparatus 10 cut along a line I-I' in FIG. 2. FIG. 8 is a graph illustrating a light advancing angle of the first light beam and the second light beam of FIG. 7. In FIG. 8, the X axis represents the light advancing angle of a first incident light beam LSL11 and a second incident light beam LSL12 and the Y axis represents the light advancing angle of a first light beam CHL11 and a second light beam CHL12.

Referring to FIGS. 2, 7 and 8, the touch position detecting apparatus 10 includes the light emitting part 100 disposed on the light incident surface 310, and the light receiving part 500 disposed on the light exiting surface 330.

The light emitting part 100 includes a first light emitting element 110 and a second light emitting element 120. The first light emitting element 110 and the second light emitting element 120 may be, for example, infrared ray LEDs.

The first light emitting element 110 and the second light emitting element 120 may be sequentially disposed along the light incident surface 310. The light emitting surfaces of the first light emitting element 110 and the second light emitting element 120 are typically oriented toward the light incident surface 310. The light emitting surfaces of the first light emitting element 110 and the second light emitting element 120 may be oriented in different directions from each other.

The first light emitting element 110 emits the first incident light beam LSL11 toward the light incident surface 310 at angle of about 40 degrees with respect to the first direction D1, which is the light advancing direction in the light waveguide 300. A light emitting angle of the first light emitting element 110 is between about −10 degrees and about 10 degrees with respect to a front direction.

The second light emitting element 120 is disposed substantially parallel to the upper surface of the light waveguide 300. The second light emitting element 120 emits the second incident light beam LSL12 toward the light incident surface 310 at an angle of about 0 degree with respect to the first direction D1. The light emitting angle of the second light emitting element 120 is between about −10 degrees and about 10 degrees with respect to the front direction.

Accordingly, the first incident light beam LSL11 advances at an angle of between about 30 degrees and about 50 degrees in the air, and the second incident light beam LSL12 advances at an angle between about −10 degrees and about 10 degrees in the air.

Herein, the first incident light beam LSL11 and the second incident light beam LSL12 may be represented as incident lights L11 which are the lights before being incident to the light waveguide 300.

The upper surface of the light waveguide 300 may be substantially perpendicular to the light incident surface 310.

The first incident light beam LSL11 and the second incident light beam LSL12 respectively become the first light beam CHL11 and the second light beam CHL12 after passing through the light incident surface 310 of the light waveguide 300. The first light beam CHL11 and the second light beam CHL12 may be represented as transmitting lights L12.

The light receiving part 500 includes a first light receiving element 510 and a second light receiving element 520.

The first light receiving element 510 and the second light receiving element 520 may be, for example, photo transistors.

The first light receiving element 510 and the second light receiving element 520 are disposed along light exiting surface 330 and positioned to correspond to the first light emitting element 110 and the second light emitting element 120, respectively.

In addition, the light incident surface 310 and the light exiting surface 330 have symmetric shapes and are symmetrically disposed so that the first light beam CHL11 is received by the first light receiving element 510 and the second light beam CHL12 is received by the second light receiving element 520.

The light advancing angles of the first light beam CHL11 and the second light beam CHL12 may be adjusted by the refractive index of the first touching element, such as a human hand, the refractive index of the light waveguide and the refractive index of the second touching element, such as a pen.

The first incident light beam LSL11 and the second incident light beam LSL12 are refracted on the light incident surface 310 to form the first light beam CHL11 and the second light beam CHL12. Equation 2 represents the light advancing angles of the first light beam CHL11 and the second light beam CHL12 with respect to the first direction. D1.

$$\theta 2 = 90 - \alpha - \sin^{-1}\left[\frac{n1}{n2}\sin(90 - \alpha - \theta 1)\right]$$ [Equation 2]

Here, α is an angle between the upper surface of the light waveguide 300 and the light incident surface 310. θ1 is an angle between the first light emitting element 110 and the first direction D1 or between the second light emitting element 120 and the first direction D1.

In the present example embodiment, the angle α between the upper surface of the light waveguide 300 and the light incident surface 310 is about 90 degrees and the angle θ1 between the first light emitting element 110 and the first direction D1 is about 40 degrees. The first light beam CHL11 advances from the light incident surface 310 into the light waveguide 300 at an angle between about 20 degrees and about 31 degrees, which are represented as θ2, when the first incident light beam LSL11 advances and passes through the light incident surface 310 at an angle of between about 30 degrees and about 50 degrees.

The angle α between the upper surface of the light waveguide 300 and the light incident surface 310 is about 90 degrees and the angle θ1 between the second light emitting element 120 and the first direction D1 is about 0 degree. The second light beam CHL12 advances from the light incident surface 310 into the light waveguide 200 at an angle between about −7 degrees and about 7 degrees when the second incident light beam LSL12 advances and passes through the light incident surface 310 at an angle of between about −10 degrees and about 10 degrees.

Thus, a range of the light advancing angle of the first light beam CHL11, which is between about 20 degrees and about 31 degrees, is included in a range between about 17 degrees and about 48 degrees of FIGS. 3A to 3C and FIGS. 5A to 5C, so that the first light beam CHL11 is partially reflected when the first light beam CHL11 meets the first touching element and the second touching element.

In a similar manner, a range of the light advancing angle of the second light beam CHL12, which is between about −7 degrees and about 7 degrees, is included in a range between about −17 degrees and about 17 degrees of FIGS. 4A to 4C, so that the second light beam CHL12 is partially reflected when the second light beam CHL12 meets the second touching element.

Only the second light beam CHL12, which is in a range of the light advancing angle between about −7 degrees and about 7 degrees that overlaps with a range between about −17 degrees to the third critical angle c and with a range between about the third critical angle c and about 17 degrees, is partially reflected by the second touching element. Thus, when the refractive index of the second touching element is adequately adjusted in a range between about 1.42 and about 1.48 so that the third critical angle c is larger than −7 degrees and smaller than 7 degrees, the entire second light beam CHL12 is partially reflected when the second light beam CHL12 meets the second touching element.

Figure 9:
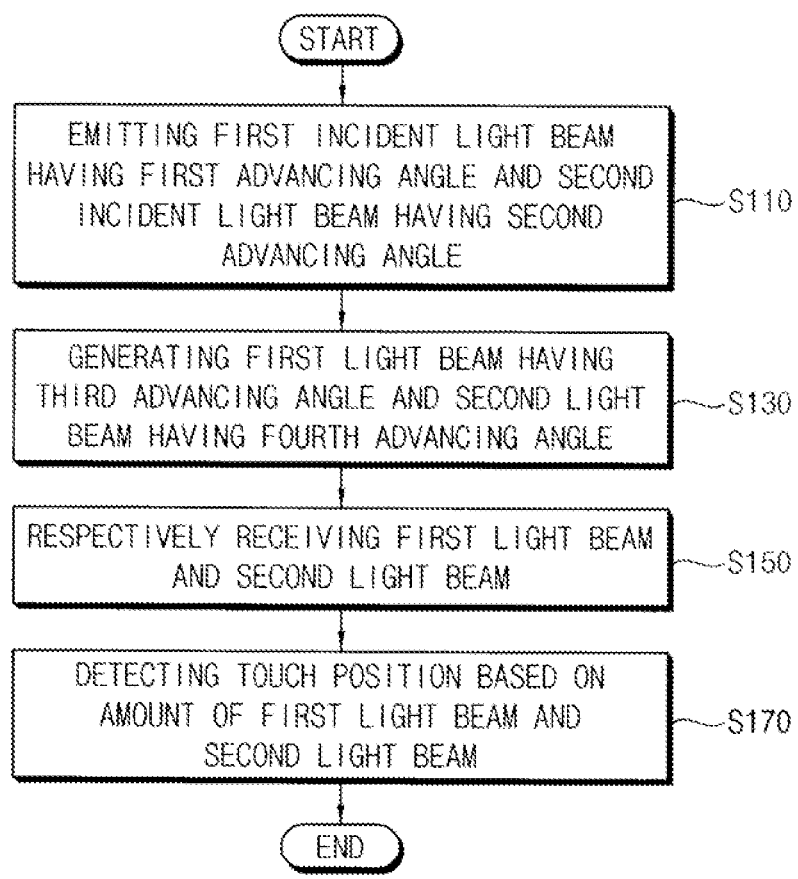
FIG. 9 is a flow chart illustrating a method of detecting a touch position performed by the touch position detecting apparatus of FIG. 7.

FIG. 9 is a flow chart illustrating a method of detecting the touch position that is performed by the touch position detecting apparatus of FIG. 7.

Referring to FIGS. 7 and 9, the first light emitting element 110 emits the first incident light beam LSL11 having a first advancing angle between about 30 degrees and about 50 degrees and the second light emitting element 120 emits the second incident light beam LSL12 having a second advancing angle between about −10 degrees and about 10 degrees (step S110).

The first light beam CHL11 having a third advancing angle between about 20 degrees and about 31 degrees and the second light beam CHL12 having a fourth advancing angle between about −7 degrees and about 7 degrees are generated when the first incident light beam LSL11 and the second incident light beam LSL12 pass through the light incident surface 310 (step S130).

The first light receiving element 510 and the second light receiving element 520 respectively receive the first light beam CHL11 and the second light beam CHL12, which are partially reflected by the touching elements (step S150).

The detecting part 600 detects the touch positions according to an amount of light in the first light beam CHL11 and the second light beam CHL12 received by the first light receiving element 510 and the second light receiving element 520, respectively (step S170).

For example, the touch positions of the first touching element and the second touching element are detected by detecting that an amount of light in the first light beam CHL11 is decreased, and the touch position of only second touching element is detected by detecting that an amount of light in the second light beam CHL12 is decreased.

The detecting part 600 may detect the touch position of the n-th touching element based on the n-th light beam and the touch positions of the n-th touching element and the (n−1)-th touching element based on the (n−1)-th light beam. As a result, the detecting part 600 may detect the touch position of the (n−1)-th touching element.

According to the present example embodiment, the light emitting elements provide light beams to the light waveguide 300 that have paths that are different from each other, and the light waveguide 300 transmits the light beams having the different paths so that the respective touch positions of the touching elements may be detected.

Figure 10:
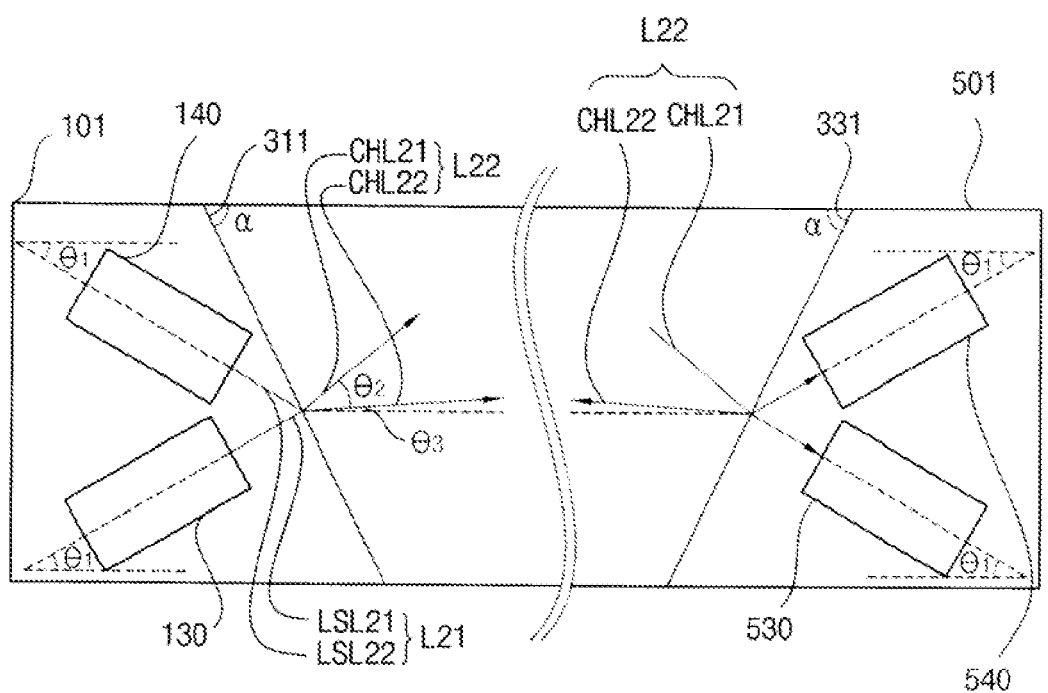
FIG. 10 is cross-sectional view illustrating a touch position detecting apparatus according to another example embodiment.
Figure 11:
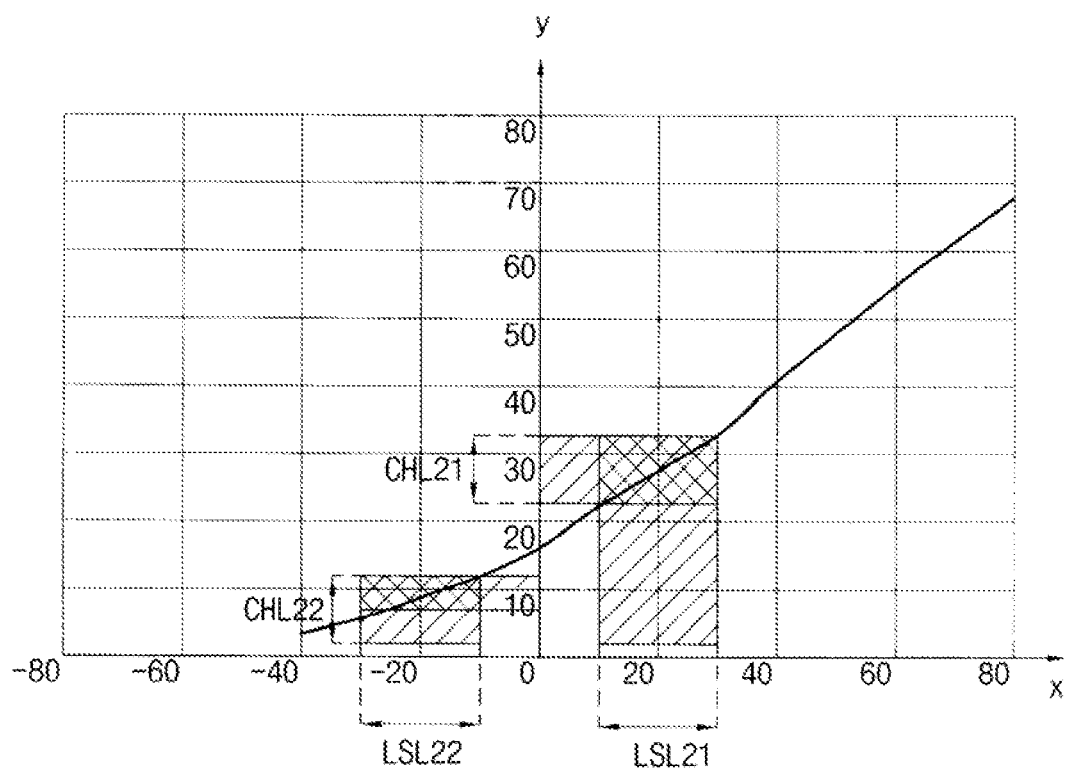
FIG. 11 is a graph illustrating a light advancing angle of a first light beam and a second light beam shown in FIG. 10.

FIG. 10 is cross-sectional view illustrating a touch position detecting apparatus according to another example embodiment. FIG. 11 is a graph illustrating a light advancing angle of a first light beam and a second light beam of FIG. 10. In FIG. 11, the X axis represents the light advancing angle of a first incident light beam LSL21 and a second incident light beam LSL22, and the Y axis represents the light advancing angle of a first light beam CHL21 and a second light beam CHL22.

A perspective view and a plan view of a display apparatus according to the present example embodiment are the same as those of the previous example embodiment shown in FIGS. 1 and 2. Thus, the same reference numerals will be used to refer to the same or like parts as those described in the previous example embodiment of FIGS. 1 and 2, and repetitive explanation concerning the above elements will be omitted.

In the present example embodiment, the transmission condition of the first light beam and the transmission condition of the second light beam in a light waveguide according to a first refractive index of the light waveguide are substantially same as those of the previous example embodiment shown in FIGS. 3A to 4C. Thus, the same reference numerals will be used to refer to the same or like parts as those described in the previous example embodiment of FIGS. 3A to 4C, and repetitive explanation concerning the above elements will be omitted.

Additionally, in the present example embodiment, the transmission condition of the first light beam and the transmission condition of the second light beam in a light waveguide according to a second refractive index of the light waveguide are substantially the same as those of the previous example embodiment shown in FIGS. 5A to 6C. Thus, the same reference numerals will be used to refer to the same or like parts as those described in the previous example embodiment of FIGS. 5A to 6C, and repetitive explanation concerning the above elements will be omitted.

Referring to FIGS. 2, 10 and 11, the touch position detecting apparatus 20 includes a light emitting part 101 disposed on a light incident surface 311, and a light receiving part 501 disposed on a light exiting surface 331.

The light emitting part 101 includes a first light emitting element 130 and a second light emitting element 140.

The first light emitting element 130 and the second light emitting element 140 may be sequentially disposed along the light incident surface 311.

The touch position detecting apparatus 20 according to the present example embodiment may be used in place of the touch position detecting apparatus 10 of the previous example embodiment shown in FIG. 2.

Thus, the light emitting part 101 corresponds to the light emitting part 100 in FIG. 2. The light incident surface 311 and the light exiting surface 331 correspond to the light incident surface 310 and the light exiting surface 330 in FIG. 2. The light receiving part 501 corresponds to the light receiving part 500 in FIG. 2.

The first light emitting element 130 emits the first incident light beam LSL21 toward the upper surface of the light waveguide 300 at an angle of about 20 degrees with respect to the first direction D1, which is the light advancing direction in the light waveguide 300.

The second light emitting element 140 emits the second incident light beam LSL22 to the lower surface of the light waveguide 300 at an angle of about −20 degrees with respect to the first direction D1, which is the light advancing direction in the light waveguide 300.

Accordingly, the first incident light beam LSL21 advances at an angle between about 10 degrees and about 30 degrees in the air and the second incident light beam LSL22 advances at an angle between about −30 degrees and about −10 degrees in the air. Herein, the first incident light beam LSL21 and the second incident light beam LSL22 may be represented as incident lights L21 which are the lights before being incident to the light waveguide 300.

The upper surface of the light incident face 311 may be inclined by an angle of about 45 degrees with respect to the light waveguide 300.

The first incident light beam LSL21 and the second incident light beam LSL22 respectively become the first light beam CHL21 and the second light beam CHL22 after passing through the light incident surface 311 of the light waveguide 300. The first light beam CHL21 and the second light beam CHL22 may be represented as transmitting lights L22.

The light receiving part 501 includes a first light receiving element 530 and a second light receiving element 540. The first light receiving element 530 and the second light receiving element 540 are disposed along light exiting surface 331 and positioned to correspond to the first light emitting element 130 and the second light emitting element 140, respectively.

In addition, the light incident surface 311 and the light exiting surface 331 have symmetric shapes and are symmetrically disposed so that the first light beam CHL21 is received by the first light receiving element 530 and the second light beam CHL22 is received by the second light receiving element 540.

The first incident light beam LSL21 and the second incident light beam LSL22 are refracted on the light incident surface 311 to form the first light beam CHL21 and the second light beam CHL22. The light advancing angles of the first light beam CHL21 and the second light beam CHL22 with respect to the first direction D1 may be determined using Equation 2 of the previous example embodiment.

In the present example embodiment, the angle α between the upper surface of the light waveguide 300 and the light incident surface 311 is about 45 degrees and the angle θ1 between the first light emitting element 130 and the first direction D1 is about 20 degrees. The first light beam CHL21 advances at an angle between about 22 degrees and about 35 degrees, which are represented as θ2, when the first incident light beam LSL21 advances and passes through the light incident surface 310 at an angle of between about 10 degrees and about 30 degrees.

The angle α between the upper surface of the light waveguide 300 and the light incident surface 311 is about 45 degrees and the angle θ1 between the second light emitting element 140 and the first direction D1 is about −20 degrees. The second light beam CHL22 advances at an angle between about 4 degrees and about 11 degrees, which are represented as θ3 when the second incident light beam LSL22 advances and passes through the light incident surface 311 at an angle of between about −30 degrees and about −10 degrees.

Thus, a range of the light advancing angle of the first light beam CHL21, which is between about 22 degrees and about 35 degrees, is included in the range between about 17 degrees and about 48 degrees of FIGS. 3A to 3C and FIGS. 5A to 5C, so that the first light beam CHL21 is partially reflected when the first light beam CHL21 meets the first touching element and the second touching element.

In a similar manner, a range of the light advancing angle of the second light beam CHL22, which is between about 4 degrees and about 11 degrees, is included in the range between about −17 degrees and about 17 degrees of FIGS. 4A to 4C, so that the second light beam CHL22 is partially reflected when the second light beam CHL22 meets the second touching element.

Only the second light beam CHL22, which is in a range of the light advancing angle between about 4 degrees and about 11 degrees that overlaps with the range between about −17 degrees to the third critical angle c and with the range between about the third critical angle c and about 17 degrees, is partially reflected by the second touching elements. Thus, when the refractive index of the second touching element is adequately adjusted in the range between about 1.42 and about 1.48 so that the third critical angle c is smaller than 11 degrees, the entire second light beam CHL22 is partially reflected when the second light beam CHL22 meets the second touching element.

Figure 12:
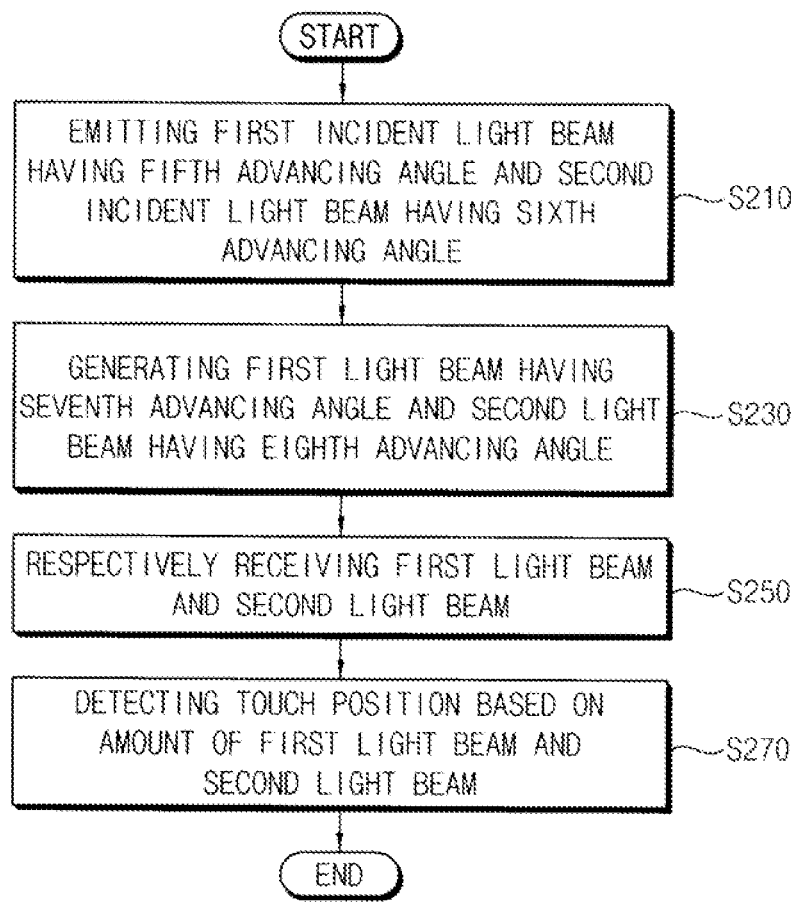
FIG. 12 is a flow chart illustrating a method of detecting a touch position performed by the touch position detecting apparatus shown in FIG. 10.

FIG. 12 is a flow chart illustrating a method of detecting a touch position that is performed by the touch position detecting apparatus of FIG. 10.

Referring to FIGS. 10 and 12, the first light emitting element 130 emits the first incident light beam LSL21 having a fifth advancing angle between about 10 degrees and about 30 degrees and the second light emitting element 140 emits the second incident light beam LSL22 having a sixth advancing angle between about −30 degrees and about −10 degrees (step S210).

The first light beam CHL21 having a seventh advancing angle between about 22 degrees and about 35 degrees and the second light beam CHL22 having an eighth advancing angle between about 4 degrees and about 11 degrees are generated when the first incident light beam LSL21 and the second incident light beam LSL22 pass through the light incident surface 311 (step S230).

The first light receiving element 530 and the second light receiving element 540 respectively receive the first light beam CHL21 and the second light beam CHL22, which are partially reflected by the touching elements (step S250).

The detecting part 600 detects the touch positions according to an amount of the first light beam CHL21 and the second light beam CHL22 received by the first light receiving element 530 and the second light receiving element 540 (step S270).

For example, the touch positions of the first touching element and the second touching element are detected by detecting that an amount of light in the first light beam CHL21 is decreased, and the touch position of only second touching element is detected by detecting that an amount of light in the second light beam CHL22 is decreased.

According to the present example embodiment, the light emitting elements provide light beams to the light incident surface 311 of the light waveguide 300 having an inclination, and thus provide lights that have paths to the light waveguide 300 that are different from each other. The light waveguide 300 transmits the light beams having the different paths, so that the touch positions of the touching elements may be detected individually.

Figure 13:
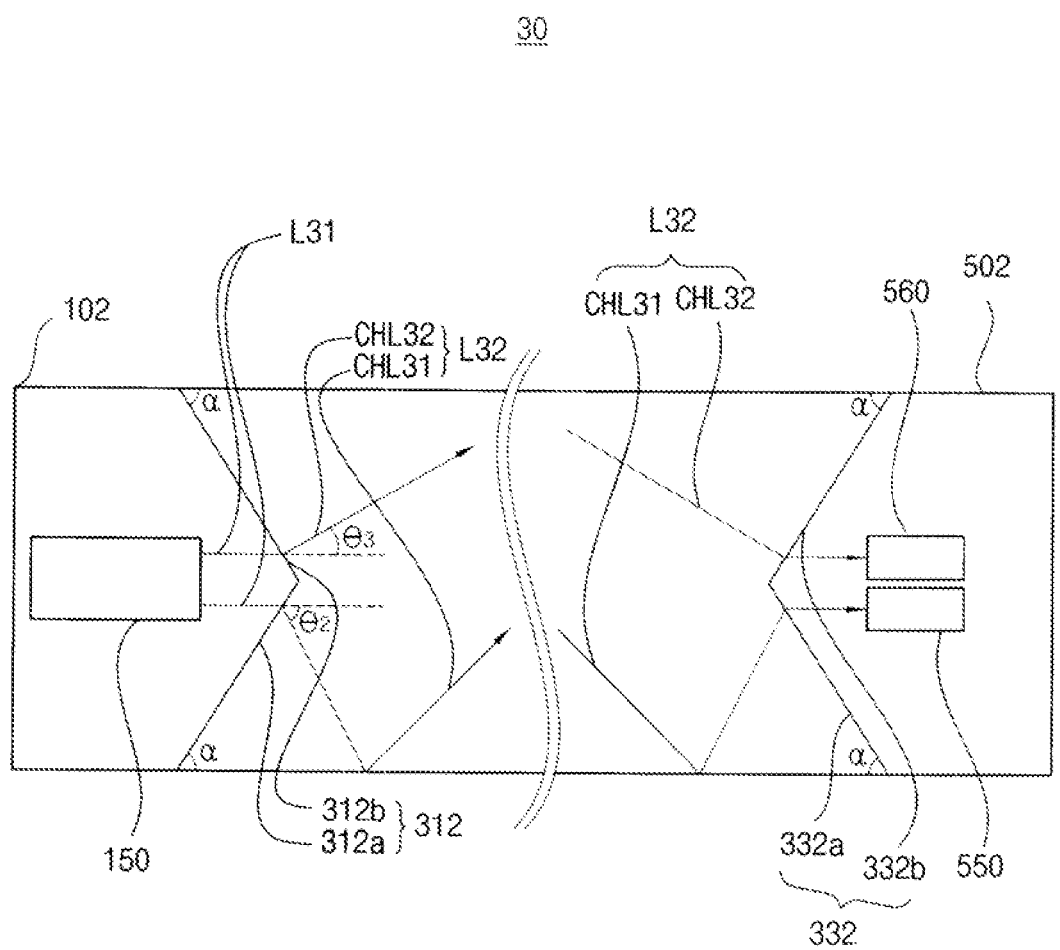
FIG. 13 is cross-sectional view illustrating a touch position detecting apparatus according to another example embodiment.
Figure 14:
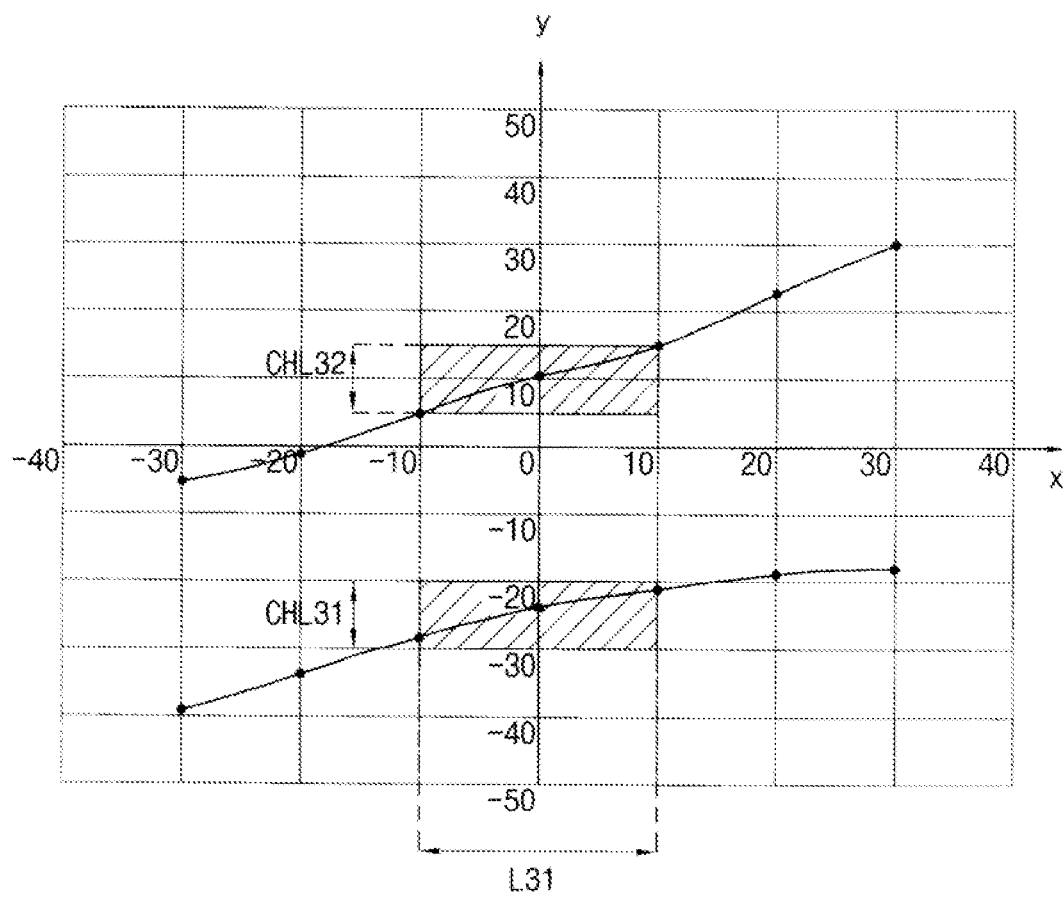
FIG. 14 is a graph illustrating a light advancing angle of a first light beam and a second light beam shown in FIG. 13.

FIG. 13 is cross-sectional view illustrating a touch position detecting apparatus according to still another example embodiment. FIG. 14 is a graph illustrating a light advancing angle of a first light beam and a second light beam of FIG. 13. In FIG. 14, the X axis represents the light advancing angle of incident light L31 and the Y axis represents the light advancing angle of a first light beam CHL31 and a second light beam CHL32.

A perspective view and a plan view of a display apparatus of the present example embodiment are the same as those of the previous example embodiment shown in FIGS. 1 and 2. Thus, the same reference numerals will be used to refer to the same or like parts as those described in the previous example embodiment of FIGS. 1 and 2 and repetitive explanation concerning the above elements will be omitted.

In the present example embodiment, the transmission condition of the first light beam and the transmission condition of the second light beam in a light waveguide according to a first refractive index of the light waveguide are substantially same as those of the previous example embodiment shown in FIGS. 3A to 4C. Thus, the same reference numerals will be used to refer to the same or like parts as those described in the previous example embodiment of FIGS. 3A to 4C and repetitive explanation concerning the above elements will be omitted.

Additionally, the transmission condition of the first light beam and the transmission condition of the second light beam in a light waveguide according to a second refractive index of the light waveguide are substantially same as those of the previous example embodiment shown in FIGS. 5A to 6C. Thus, the same reference numerals will be used to refer to the same or like parts as those described in the previous example embodiment of FIGS. 5A to 6C and repetitive explanation concerning the above elements will be omitted.

Referring to FIGS. 2, 13 and 14, the touch position detecting apparatus 30 includes a light emitting part 102 disposed on a light incident surface 312, and a light receiving part 502 disposed on a light exiting surface 332.

The light emitting part 102 includes a light emitting element 150.

The touch position detecting apparatus 30 according to the present example embodiment may be used in place of the touch position detecting apparatus 10 of the example embodiment shown in FIG. 2.

Thus, the light emitting part 102 corresponds to the light emitting part 100 in FIG. 2. The light incident surface 312 and the light exiting surface 332 correspond to the light incident surface 310 and the light exiting surface 330 in FIG. 2. The light receiving part 502 corresponds to the light receiving part 500 in FIG. 2.

The light emitting element 150 emits the incident light L31 toward the light waveguide 300 along the first direction D1.

The light incident surface 312 includes a first surface 312a connected to a lower surface of the light waveguide 300, and a second surface 312b connected to an upper surface of the light waveguide 300.

The lower surface of the light waveguide 300 may be inclined by an angle of about −30 degrees with respect to the first surface 312a and the upper surface of the light waveguide 300 may be inclined by an angle of about 60 degrees with respect to the second surface 312b. Accordingly, the light incident surface 312 converts the incident light L31 into the first light beam CHL31 and the second light beam CHL32. The first light beam CHL31 and the second light beam CHL32 may be represented as transmitting lights L32.

The light receiving part 502 includes a first light receiving element 550 and a second light receiving element 560. The light incident surface 312 and the light exiting surface 332 have symmetric shapes and are symmetrically disposed, so that the first light beam CHL31 and the second light beam CHL32 are transmitted through the light waveguide 300 along different paths from each other, but both exit from the light exiting surface 332 along the first direction D1. The first light beam CHL31 may be received by the first light receiving element 550, and the second light beam CHL32 may be received by the second light receiving element 560.

The incident light L31 is refracted on the light incident surface 312 to form the first light beam CHL31 and the second light beam CHL32. The light advancing angles of the first light beam CHL31 and the second light beam CHL32 with respect to the first direction D1 may be determined using Equation 2 of the previous example embodiment.

In the present example embodiment, the angle α between the lower surface of the light waveguide 300 and the light incident surface 312 is about −30 degrees and the angle between the light emitting element 150 and the first direction D1 is about 0 degree, so that the first light beam CHL31 advances at an angle between about −21 degrees and about −29 degrees, which are represented as θ2 by the first surface 312a when the incident light L31 advances and passes through the light incident surface 312 at an angle of between about −10 degrees and about 10 degrees.

The angle α between the upper surface of the light waveguide 300 and the light incident surface 312 is about 60 degrees and the angle between the light emitting element 150 and the first direction D1 is about 0 degree, so that the second light beam CHL22 advances at an angle between about 4 degrees and about 17 degrees which are represented as θ3 by the second surface 312b when the incident light beam L31 advances and passes through the light incident surfaced 312 at an angle between about −10 degrees and about 10 degrees.

Thus, a range of the light advancing angle of the first light beam CHL31 according to the light emitting element 150 and a structure of the first surface 312a between about −21 degrees and about −29 degrees, is included in the range between about 17 degrees and about 48 degrees of FIGS. 3A to 3C and FIGS. 5A to 5C, so that the first light beam CHL31 is partially reflected when the first light beam CHL31 meets the first touching element and the second touching element.

In a similar manner, a range of the light advancing angle of the second light beam CHL32 according to the light emitting element 150 and a structure of the second surface 312b between about 4 degrees and about 17 degrees is included in the range between about −17 degrees and about 17 degrees of FIGS. 4A to 4C, so that the second light beam CHL32 is partially reflected when the second light beam CHL32 meets the second touching element.

Only the second light beam CHL32 in a range of the light advancing angle between about 4 degrees and about 17 degrees which overlaps with the range between about −17 degrees to the third critical angle c and with the range between about the third critical angle c and about 17 degrees is partially reflected by the second touching elements. Thus, when the refractive index of the second touching element is adequately adjusted in the range between about 1.42 and about 1.48 so that the third critical angle c is smaller than 17 degrees, the entire second light beam CHL32 is partially reflected when the second light beam CHL32 meets the second touching element.

Figure 15:
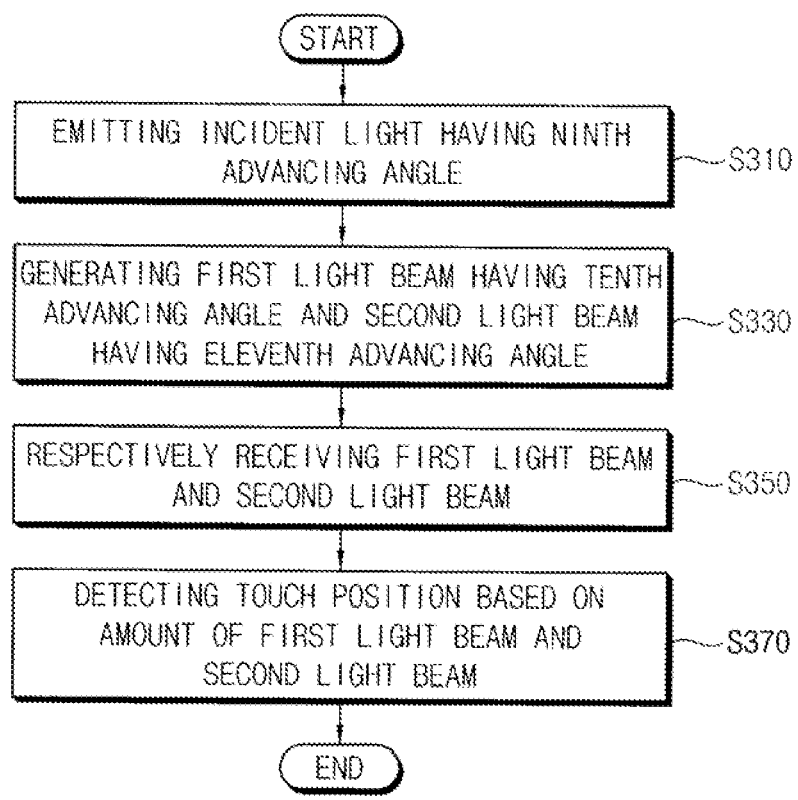
FIG. 15 is a flow chart illustrating a method of detecting a touch position performed by the touch position detecting apparatus shown in FIG. 13.

FIG. 15 is a flow chart illustrating a method of detecting a touch position performed by the touch position detecting apparatus of FIG. 13.

Referring to FIGS. 13 and 15, the light emitting element 150 emits the incident light L31 having a ninth advancing angle between about −10 degrees and about 10 degrees (step S310).

The first light beam CHL31 having a tenth advancing angle between about −21 degrees and about −29 degrees and the second light beam CHL32 having an eleventh advancing angle between about 4 degrees and about 17 degrees are generated when the incident light L31 passes through the light incident surface 312 (step S330).

Herein, the first surface 312*a* and the second surface 312*b* of the light incident surface 312 having inclinations different from each other convert the incident light L31 into the first light beam CHL31 and the second light beam CHL32 having different paths from each other.

The first light receiving element 550 and the second light receiving element 560 respectively receive the first light beam CHL31 and the second light beam CHL32 which are partially reflected by the touching elements (step S350).

The detecting part 600 detects the touch positions according to an amount of light received from the first light beam CHL31 and the second light beam CHL32 by the first light receiving element 550 and the second light receiving element 560, respectively (step S370).

For example, the touch positions of the first touching element and the second touching element are detected by detecting that an amount of light in the first light beam CHL31 is decreased, and the touch position of only second touching element is detected by detecting that an amount of light in the second light beam CHL32 is decreased.

According to the present example embodiment, the conventional light emitting part may provide lights having paths that are different from each other to the light waveguide 300 so that the touch positions of the touching elements may be detected individually.

As described above, according to the present invention, the touch positions of the touching elements may be individually detected using the light beams partially reflected and having paths different from each other. Thus, the several touching elements may be individually used. In addition, when various kinds of touches are applied at the same time, the touches by the touching elements may be correctly selected.

The foregoing is illustrative and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present invention. In the claims, means-plus-function clauses are intended to cover the structures described herein as performing the recited function and not only structural equivalents but also equivalent structures. Therefore, it is to be understood that the foregoing is illustrative of and is not to be construed as limited to the specific example embodiments disclosed, and that modifications to the disclosed example embodiments, as well as other example embodiments, are intended to be included within the scope of the disclosure.

What is claimed is:

1. A touch position detecting apparatus comprising:
a light emitting part emitting light;
a light waveguide having a uniform refractive index, the light waveguide comprising:
a light incident surface disposed adjacent to the light emitting part, the light being incident to the light incident surface;
a touch surface touched by a touch; and
a light exiting surface opposite to the light incident surface, a plurality of light beams derived from the light exiting the light exiting surface, the light beams having different paths from each other through the light waveguide, the light beams being partially reflected according to the touch;
a light receiving part adjacent to the light exiting surface and comprising a plurality of light receiving elements respectively receiving the light beams exiting from the light exiting surface; and
a detecting part detecting a touch position based on an amount of the light in the light beams received by the light receiving part,
wherein the plurality of light beams includes a first light beam incident onto the touch surface with a first incident angle and a second light beam incident onto the touch surface with a second incident angle greater than the first incident angle, the first incident angle set to totally reflect the first light beam into the light waveguide when a first touch element having a first refractive index contacts the touch surface and to partially reflect the first light beam into the light waveguide when a second touch element having a second refractive index different from the first refractive index contacts the touch surface, the second incident angle set to partially reflect the second light beam into the light waveguide when the first touch element contacts the touch surface, the light receiving part receiving the first light beam and second light beam independently, and the detecting part discriminating between the first touch element having the first refractive index contacting the touch surface and the second touching element having the second refractive index contacting the touch surface based on the amount of light received from the first light beam and the second light beam,
wherein the light is emitted by a plurality of light emitting elements that each emit one or more light beams and each of the light emitting elements are oriented in a different direction from each other with respect to the light incident surface.

2. The touch position detecting apparatus of claim 1, wherein the light emitting part comprises a plurality of light emitting elements emitting the light beams.

3. The touch position detecting apparatus of claim 2, wherein light emitting surfaces of the light emitting elements emit light in different directions from each other.

4. The touch position detecting apparatus of claim 3, wherein the light incident surface is substantially perpendicular to the touch surface of the light waveguide.

5. The touch position detecting apparatus of claim 4, wherein the light exiting surface is substantially perpendicular to the touch surface of the light waveguide.

6. The touch position detecting apparatus of claim 3, wherein the light incident surface is connected to the touch surface of the light waveguide with a first inclination angle.

7. The touch position detecting apparatus of claim 6, wherein the light exiting surface is connected to the touch surface of the light waveguide with a second inclination angle, and the first inclination angle is substantially equal to the second inclination angle.

8. The touch position detecting apparatus of claim 1, wherein the light incident surface of the light waveguide comprises a plurality of first inclined surfaces, and the first inclined surfaces convert the light emitted from the light emitting part into the light beams.

9. The touch position detecting apparatus of claim 8, wherein the light exiting surface of the light waveguide comprises a plurality of second inclined surfaces, and the second inclined surfaces respectively face the first inclined surfaces.

10. A display apparatus comprising:
a light emitting part emitting light;
a light waveguide having a uniform refractive index, the light waveguide comprising:
    a light incident surface disposed adjacent to the light emitting part, the light being incident to the light incident surface;
    a touch surface touched by a touch; and
    a light exiting surface opposite to the light incident surface, a plurality of light beams exiting the light exiting surface, the light beams having different paths from each other through the light waveguide, the light beams being partially reflected according to the touch;
a light receiving part adjacent to the light exiting surface and comprising a plurality of light receiving elements respectively receiving the light beams exiting from the light exiting surface; and
a detecting part detecting a touch position based on an amount of light in the light beams received by the light receiving part; and
a display panel disposed under the light waveguide and displaying an image according to the touch position,
wherein the plurality of light beams includes a first light beam incident onto the touch surface with a first incident angle and a second light beam incident onto the touch surface with a second incident angle greater than the first incident angle, the first incident angle set to totally reflect the first light beam into the light waveguide when a first touch element having a first refractive index contacts the touch surface and to partially reflect the first light beam into the light waveguide when a second touch element having a second refractive index different from the first refractive index contacts the touch surface, the second incident angle set to partially reflect the second light beam into the light waveguide when the first touch element contacts the touch surface, the light receiving part receiving the first light beam and second light beam independently, and the detecting part discriminating between the first touch element having the first refractive index contacting the touch surface and the second touching element having the second refractive index contacting the touch surface based on the amount of light received from the first light beam and the second light beam,
wherein the light is emitted by a plurality of light emitting elements that each emit one or more light beams and each of the light emitting elements are oriented in a different direction from each other with respect to the light incident surface.

11. The display apparatus of claim 10, wherein the light emitting part comprises a plurality of light emitting elements emitting the light beams.

12. The display apparatus of claim 11, wherein the light incident surface is connected to the touch surface of the light waveguide with a first inclination angle, the light exiting surface is connected to the touch surface of the light waveguide with a second inclination angle, and the first inclination angle is substantially equal to the second inclination angle.

13. The display apparatus of claim 10, wherein the light incident surface of the light waveguide comprises a plurality of first inclined surfaces, and the first inclined surfaces convert the light emitted from the light emitting part into the light beams.

14. The display apparatus of claim 13, wherein the light exiting surface of the light waveguide comprises a plurality of second inclined surfaces, and the second inclined surfaces respectively face the first inclined surfaces.

* * * * *